(12) United States Patent
Chen

(10) Patent No.: US 12,519,513 B2
(45) Date of Patent: Jan. 6, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 53 days.

(21) Appl. No.: 18/426,268

(22) Filed: Jan. 29, 2024

(65) Prior Publication Data

US 2024/0187051 A1   Jun. 6, 2024

Related U.S. Application Data

(63) Continuation of application No. PCT/CN2021/112333, filed on Aug. 12, 2021.

(51) Int. Cl.
*H04B 7/02*     (2018.01)
*H04B 7/0456*   (2017.01)

(52) U.S. Cl.
CPC ................ *H04B 7/0456* (2013.01)

(58) Field of Classification Search
CPC ................... H04B 7/0456; H04B 7/0639
(Continued)

(56) References Cited

U.S. PATENT DOCUMENTS

| | | | |
|---|---|---|---|
| 9,287,948 B2* | 3/2016 | Kim ...................... | H04L 5/0005 |
| 2011/0158335 A1* | 6/2011 | Lee ...................... | H04B 7/0456 |
| | | | 375/295 |

(Continued)

FOREIGN PATENT DOCUMENTS

| CN | 108631831 A | 10/2018 |
|---|---|---|
| CN | 110535589 A | 12/2019 |

(Continued)

OTHER PUBLICATIONS

3GPP, "Technical Specification Group Radio Access Network; Evolved Universal Terrestrial Radio Access (E-UTRA); Multiplexing and channel coding (Release 15)," 3GPP TS 36.212 V15.11.0, Sep. 30, 2020.

(Continued)

*Primary Examiner* — Helene E Tayong
(74) *Attorney, Agent, or Firm* — Ladas & Parry, LLP

(57) ABSTRACT

Embodiments of the present disclosure provide a wireless communication method, a terminal device, a network device, and a chip. the method includes a terminal device determining a precoding matrix from a preconfigured codebook based on one or more Transmit Precoding Matrix Indicator (TPMI) indicated by a network device; wherein the precoding matrix includes N rows, N is a multiple of 2 and greater than 4, the precoding matrix satisfies a first condition or a second condition, the first condition is that each column of the precoding matrix includes two non-zero elements, and the second condition is that each column of the precoding matrix includes four non-zero elements; employing the precoding matrix to precode data; and transmitting precoded data.

18 Claims, 4 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2014/0369436 A1 | 12/2014 | Zhang et al. | |
| 2019/0097710 A1* | 3/2019 | Park | H04W 52/28 |
| 2020/0036425 A1 | 1/2020 | Ren et al. | |
| 2021/0367655 A1 | 11/2021 | Jiang et al. | |
| 2022/0408368 A1* | 12/2022 | Rupasinghe | H04W 52/146 |
| 2023/0008524 A1* | 1/2023 | Okamura | H04L 5/0048 |

FOREIGN PATENT DOCUMENTS

| | | | |
|---|---|---|---|
| CN | 111010738 A | 4/2020 | |
| WO | 2013067819 A1 | 5/2013 | |
| WO | 2023015529 A1 | 2/2023 | |

OTHER PUBLICATIONS

International Search Report for International Application No. PCT/CN2021/112333, mailed Apr. 26, 2022, with English translation provided by WIPO.

Written Opinion of the International Searching Authority for International Application No. PCT/CN2021/112333, mailed Apr. 26, 2022, with partial translation by the applicant's foreign counsel and machine English translation provided by WIPO.

* cited by examiner

100

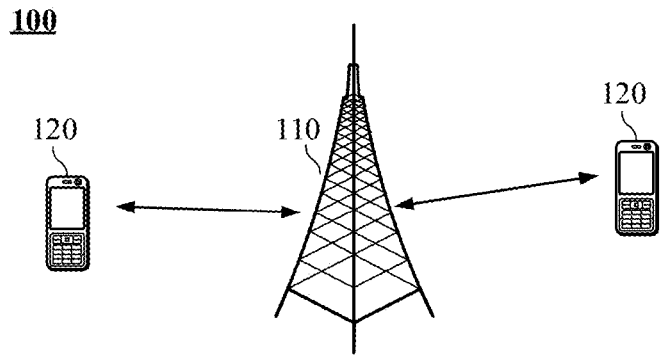

FIG. 1

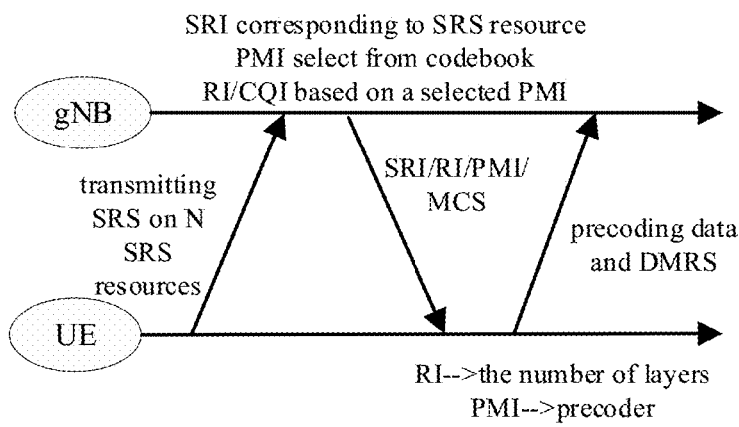

FIG. 2

200 determining, by the terminal device, a precoding matrix from a preconfigured codebook based on Transmit Precoding Matrix Indicators (TPMIs) indicated by a network device. The precoding matrix includes N rows, N is a multiple of 2 and greater than 4. The precoding matrix satisfies a first condition or a second condition, the first condition is that each column of the precoding matrix includes two non-zero elements, and the second condition is that each column of the precoding matrix includes four non-zero elements;  — S210 employing, by the terminal device, the precoding matrix to precode data;  — S220 transmitting, by the terminal device, precoded data.  — S230

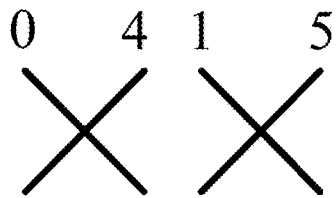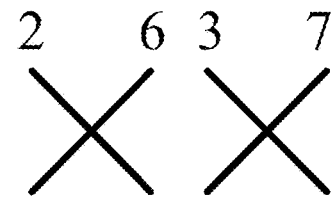

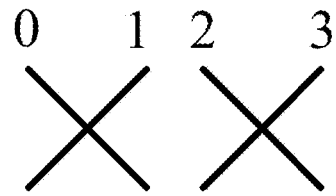

| S310 determining, by the network device, the precoding matrix from the preconfigured codebook. The precoding matrix includes N rows, N is a multiple of 2 and greater than 4. The precoding matrix satisfies the first condition or the second condition. The first condition is that each column of the precoding matrix includes two non-zero element. The second condition is that each column of the precoding matrix includes four non-zero elements;

S320 transmitting, by the network device, Transmit Precoding Matrix Indicators (TPMIs) corresponding to the precoding matrix to the terminal device. The TPMIs are configured for the terminal device to determine the precoding matrix from the preconfigured codebook.

FIG. 6

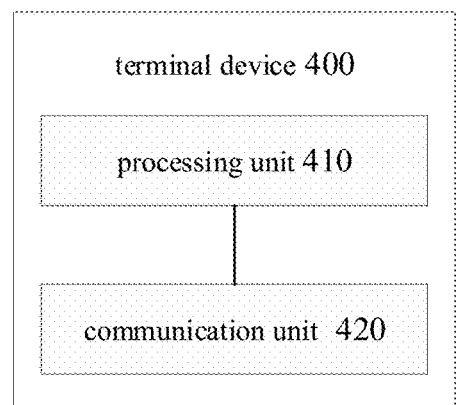

FIG. 7

WIRELESS COMMUNICATION METHOD, TERMINAL DEVICE, AND NETWORK DEVICE

CROSS-REFERENCE TO RELATED APPLICATION

The present disclosure is a continuation application of PCT Application No. PCT/CN2021/112333 filed on Aug. 12, 2021, the disclosure of which is incorporated herein by reference in its entirety.

TECHNICAL FIELD

The present disclosure relates to a field of communications, and in particular to a wireless communication method, a terminal device, and a network device.

BACKGROUND

At the present stage, in a codebook-based precoding manner, uplink transmissions support codebooks of 2-antenna ports and 4-antenna ports. The network device instructs one or more Transmit Precoding Matrix Indicator (TPMI) through Downlink Control Information (DCI). The terminal device determines the precoding matrix corresponding to the one or more TPMI from a codebook based on the one or more TPMI. For some special terminals which may support more antenna ports, how to design codebooks supporting more antenna ports is an urgent problem to be solved.

SUMMARY OF THE DISCLOSURE

Embodiments of the present disclosure provide a wireless communication method, a terminal device, and a network device.

In a first aspect, a wireless communication method is provided and includes determining, by a terminal device, a precoding matrix from a preconfigured codebook based on one or more Transmit Precoding Matrix Indicator (TPMI) indicated by a network device; wherein the precoding matrix includes N rows, N is a multiple of 2 and greater than 4, the precoding matrix satisfies a first condition or a second condition, the first condition is that each column of the precoding matrix includes two non-zero elements, and the second condition is that each column of the precoding matrix includes four non-zero elements; employing, by the terminal device, the precoding matrix to precode data; and transmitting, by the terminal device, precoded data.

In a second aspect, a wireless communication method is provided and includes determining, by a network device, a precoding matrix from a preconfigured codebook; wherein the precoding matrix includes N rows, N is a multiple of 2 and greater than 4, the precoding matrix satisfies a first condition or a second condition, the first condition is that each column of the precoding matrix includes two non-zero elements, and the second condition is that each column of the precoding matrix includes four non-zero elements; and transmitting, by the network device, one or more Transmit Precoding Matrix Indicator (TPMI) corresponding to the precoding matrix to a terminal device; wherein the one or more TPMIs are configured for the terminal device to determine the precoding matrix from the preconfigured codebook.

In a third aspect, a terminal device is provided and includes a processor and a memory. The memory is configured to store a computer program. The processor is configured to call and run the computer program stored in the memory to perform a method in the first aspect described above.

In a fourth aspect, a network device is provided and includes a processor and a memory. The memory is configured to store a computer program. The processor is configured to call and run the computer program stored in the memory to perform a method in the second aspect described above.

BRIEF DESCRIPTION OF THE DRAWINGS

FIG. 1 is a schematic diagram of a communication system architecture applied in some embodiments of the present disclosure.

FIG. 2 is a schematic view of a codebook-based PUSCH transmission according to some embodiments of the present disclosure.

FIG. 3 is a schematic flowchart of a wireless communication method according to some embodiments of the present disclosure.

FIG. 4 is a schematic diagram of mapping relationships between antennas and antenna ports according to some embodiments of the present disclosure.

FIG. 5 is a schematic diagram of another mapping relationship between an antenna and an antenna port according to some embodiments of the present disclosure.

FIG. 6 is a schematic flowchart of another wireless communication method according to some embodiments of the present disclosure.

FIG. 7 is a schematic block view of a terminal device according to some embodiments of the present disclosure.

DETAILED DESCRIPTION

Figure 8:
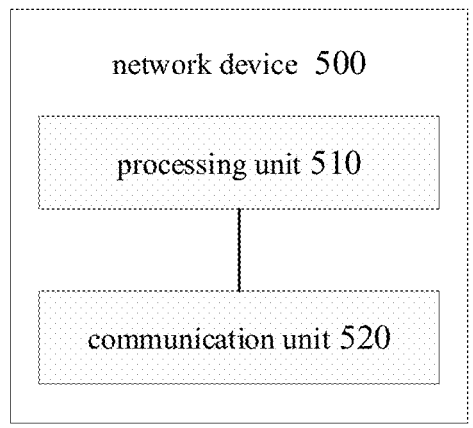
FIG. 8 is a schematic block view of a network device according to some embodiments of the present disclosure.

Technical solutions of the embodiments of the present disclosure will be described below in conjunction with accompanying drawings in the embodiments of the present disclosure. Apparently, described embodiments are a part but not all of the embodiments of the present disclosure. For the embodiments of the present disclosure, other embodiments obtained by one of ordinary skill in the related art based on the embodiments of the present disclosure without creative labor shall all fall into the scope of the present disclosure.

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system of the NR system, a LTE-based access to unlicensed spectrum (LTE-U) system, a NR-based access to unlicensed spectrum (NR-U) system, a Non- Terrestrial Network (NTN) system, a Universal Mobile Telecommunication System (UMTS), a Wireless Local Area Network (WLAN), Wireless Fidelity (WiFi), a 5th-generation communication (5th-Generation, 5G) system, or other communication systems, etc.

In general, the number of connections supported by traditional communication systems is limited and also easy to be implemented. However, with the development of communication technologies, mobile communication systems will not only support traditional communications, but also support, e.g., a (Device-to-device) (D2D) communication, a Machine to Machine (M2M) communication, a Machine Type Communication (MTC), a Vehicle to Vehicle (V2V) communication, or a Vehicle to everything (V2X)) communication, etc. The embodiments of the present disclosure may also be applied to these communication systems.

In some embodiments, the communication system in the embodiments of the present disclosure may be applied to a Carrier Aggregation (CA) scenario, or may also be applied to a Dual Connectivity (DC) scenario, or may also be applied to a Standalone (SA) network deployment scenario.

In some embodiments, the communication system in the embodiments of the present disclosure may be applied to an unlicensed spectrum. The unlicensed spectrum may also be considered to be a shared spectrum. Alternatively, the communication system in the embodiments of the present disclosure may also be applied to a Licensed spectrum. The licensed spectrum may also be considered to be an unshared spectrum.

Each embodiment is described in combination with a terminal device and a network device in the embodiments of the present disclosure. The terminal device may also be referred to as a user equipment (UE), an access terminal, a user unit, a user station, a mobile station, a remote station, a remote terminal, a mobile device, a user terminal, a terminal, a wireless communication device, a user agent, or a user apparatus, etc.

The terminal device may be a STATION (ST) in WLAN, or may be a cellular phone, a cordless phone, a session initiation protocol (SIP) phone, a wireless local loop (WLL) station, a personal digital assistant (PDA), a handheld device having a wireless communication function, a computing device, or other processing devices connected to a wireless modem, an in-vehicle device, a wearable device, a terminal device in a next generation communication system such a NR network, or a terminal device in a future evolved public land mobile network (PLMN), or the like.

In the embodiments of the present disclosure, the terminal device may be deployed on land which includes indoor or outdoor, handheld, wearable, or vehicle-mounted cases. The terminal device may also be deployed on water (e.g., a ship, etc.), and may also be deployed in the air (e.g., on an aircraft, a balloon, or a satellite, etc.).

In the embodiments of the present disclosure, the terminal device may be a Mobile Phone, a Pad, a computer with a wireless transceiving function, a virtual reality (VR) terminal device, an augmented reality (AR) terminal device, a wireless terminal device under an industrial control, a wireless terminal device in self driving, a wireless terminal devices in a remote medical, a wireless terminal device in a smart grid, a wireless terminal devices in transportation safety, and a wireless terminal device in a smart city or a wireless terminal device in a smart home, etc.

As an example, not a limitation, in the embodiments of the present disclosure, the terminal device may also be the wearable device. The wearable device may also be referred to as a wearable smart device, which is a general term of wearable devices obtained by intelligently designing and developing daily wears, such as glasses, gloves, watches, clothing, and shoes, by means of wearable techniques. The wearable devices are directly worn on a body or integrated into the clothing or an accessory of the user as a portable device. The wearable devices are more than hardware devices, may also achieve powerful functions thereof through software supports, data interactions, and cloud interactions. The wearable smart device in a broad sense includes a device having full features, a large size, and capable of achieving entire or partial functions independent of a smartphone, e.g., a smart watch, or smart glasses, etc., and a device only concentrating on a particular category of application function and required to cooperate with other devices such as the smartphone, e.g., various smart bracelets configured to monitor signs, a smart jewelry, or the like.

In the embodiments of the present disclosure, the network device may be a device configured to communicate with the terminal device. The network device may be an Access Point (AP) in the WLAN, a base transceiver station (BTS) in a GSM or CDMA system, or a NodeB (NB) in a WCDMA system, or an evolutional NodeB (eNB or eNodeB) in the LTE system, or may be a relay station, the access point, the in-vehicle device, the wearable device, and a network device (gNB) in the NR network, or a network device in the future evolved PLMN network, or a network device in a NTN network.

As an example, not a limitation, in the embodiments of the present disclosure, the network device may have a mobile characteristic. For example, the network device may be a mobile device. In an embodiment, the network device may be a satellite, a balloon station. For example, the satellite may be a Low Earth Orbit (LEO) satellite, a medium earth orbit (MEO) satellite, a geostationary earth orbit (GEO) satellite, a High Elliptical Orbit (HEO) satellite, etc. In an embodiment, the network device may also be a base station installed on a location such as the land, the water, etc.

In the embodiments of the present disclosure, the network device may provide service for a cell. The terminal device communicates with the network device through a transmission resource (e.g., a frequency domain resource, or in other words, a spectrum resource) employed by the cell. The cell may be a cell corresponding to the network device (such as, the base station). The cell may belong to a macro base station or a base station corresponding to a small cell. The small cell herein may include a Metro cell, a Micro cell, a Pico cell, a Femto cell, etc. These small cells have characteristics of a small coverage area and a low transmission power, and are suitable to provide a high-speed data transmission service.

Exemplarily, a communication system 100 applied in the embodiments of the present disclosure is as shown in FIG. 1. The communication system 100 may include a network device 110. The network device 110 may be a device communicating with a terminal device 120 (also referred to as a communication terminal or the terminal). The network device 110 nay provide a communication coverage for a particular geographical region and may communicate with terminal devices located in the coverage region.

FIG. 1 exemplarily shows one network device and two terminal devices. In some embodiments, the communication system 100 may include multiple network devices and a coverage scope of each of the multiple network devices may include other numbers of terminal devices, which is not limited in the present disclosure.

In some embodiments, the communication system 100 may also include other network entities such as a network controller and a mobility management entity, etc., which is not limited in the embodiments of the present disclosure.

It should be understood that a device having a communication function may be referred to as the communication device in the embodiments of the present disclosure. The communication system 100 shown in FIG. 1 is taken as an example, the communication device may include the network device 110 and the terminal devices 120 which have communication functions. The network device 110 and the terminal devices 120 may be the devices described above, which are not repeated herein. The communication device may also include other devices in the communication system 100, such as the network controller, the mobility management entity, and other network entities, which are not limited in the embodiments of the present disclosure.

It should be understood that the term "system" and the term "network" may often be used interchangeably herein. The term "and/or" in the description simply describes an associated relationship of associated objects and may indicate that three relationships exist herein. For example, A and/or B, may indicate three cases: A exist alone, both A and B exist, and B exists alone. A character "/" generally indicates that associated objects before and after the character "/" have an "or" relationship.

The terms used in the detailed description part of the present disclosure are only used to explain some embodiments of the present disclosure, and are not intended to limit the present disclosure. The terms "first", "second", "third", "fourth", and the like used in the description, claims, and drawings of the present disclosure are used to distinguish different objects, and are not intended to describe a specific order. In addition, the terms "including" and "having", and any modification thereof are intended to cover un-exclusive inclusion.

It should be understood that the term "indication mentioned in the embodiments of the present disclosure may be a direct indication, an indirect indication, or an indication of an associated relationship. For example, A indicates B, which may mean that A directly indicates B, e.g., B may be obtained through A; which may also mean that A indirectly indicates B, e.g., A indicates C, and B may be obtained through C; which may also mean that an associated relationship exists between A and B.

In the description of the embodiments of the present disclosure, the term "correspond" may indicate that the two may have a direct or indirect corresponding relationship, or may also indicate that the two have the associated relationship, which may also be an indicating and being indicated relationship, a configuring and being configured relationship, etc.

In the embodiments of the present disclosure, a term "predefined" or "preconfigured" may be achieved by pre-saving corresponding codes or tables in devices (e.g., including the terminal devices and the network device) or other manners capable of indicating relevant information. Implementation manners are not limited in the present disclosure. For example, the term "predefined" may refer to being defined in a protocol.

In the embodiments of the present disclosure, the term "protocol" may refer to a standard protocol in the field of communications, which may include, e.g., a LTE protocol, a NR protocol, and a related protocol applied in a future communication system, which is not limited in the present disclosure.

For convenience of better understanding the embodiments of the present disclosure, an uplink codebook transmission in relation to the present disclosure is illustrated below.

When the terminal device transmits uplink data (e.g., Physical Uplink Shared Channel (PUSCH)), a precoding process is required to be performed for the uplink data to obtain an uplink precoding gain. The precoding process is generally divided into two parts, i.e., an analog domain process and a digital domain process. The analog domain process aims at a transmitted analog signal, and generally employs a beam forming manner to map a radio frequency signal to a physical antenna. The digital domain process aims at a digital signal, is generally performed in a baseband, and employs a precoding matrix to precode the digital signal and map data of a transmission layer to a radio frequency port. Due to a limited number of radio frequency channels of the terminal, the two processing manner are required to be performed simultaneously in general. That is, the digital signal is precoded and then the analog signal is formed by using a beam. Based on difference in precoding manners, the PUSCH transmission is divided into a codebook-based transmission and a non-codebook-based transmission.

In an uplink codebook-based precoding manner, a network side may configure a terminal device with a Sounding Reference Signal (SRS) resource set dedicated for a codebook transmission. The terminal device may transmit SRSs in multiple SRS resources in the set. An SRS in each of the multiple SRS resources employs a different beam. The network may select a best SRS resource for obtaining uplink Channel State Information (CSI) and indicate a resource index to the terminal device through an SRS resource indicator (SRI) at the same time, such that the terminal device is caused to employ a beam corresponding to the SRS resource to perform a stimulation beam forming process form the data. Meanwhile, the network side may indicate a Rank Indication (RI) and one or more TPMIs through the DCI. The terminal device determines an uplink precoding matrix corresponding to the TPMIs from the codebook based on the RI and the one or more TPMIs.

As shown in FIG. 2, a codebook-based PUSCH transmission may include operations S11-S15.

In an operation S11, a UE transmits SRSs on N SRS resources.

In an operation S12, the gNB determines an SRI corresponding to one of the SRS resources and selects a Precoding Matrix Indicator (PMI) from the codebook, and determines the RI or a Channel Quantity Indicator (CQI) based on a selected PMI.

In an operation S13, the gNB transmits the SRI/RI/PMI/a Modulation and Coding Scheme (MCS) to the UE.

In an operation S14, the UE determines the number of layers based on the RI, and determines a precoder based on the PMI;

In an operation S15, the UE transmits precoded data and a Demodulation Reference Signal (DMRS) to the gNB.

To facilitate a better understanding of the embodiments of the present disclosure, an uplink codebook associated with the present disclosure is described in the following.

In the related art, the uplink supports a 2-port transmission and a 4-port PUSCH transmission. A codebook used by two antenna ports and one transmission layer is as shown in a table 1. A codebook used by four antenna ports and one transmission layer (corresponding to Discrete Fourier Transform-Spread-Orthogonal Frequency Division Multiplexing, (DFT-S-DFDM)) is as shown in a table 2. A codebook used by four antenna ports and one transmission layer (corresponding to Cyclic Prefix-Orthogonal Frequency Division Multiplexing (CP-OFDM)) is as shown in table 3. A codebook used by two antenna ports and two transmission layers (corresponding to the DFT-S-DFDM) is as shown in a table 4. A codebook used by four antenna ports and two transmission layers (corresponding to the CP-OFDM) is as shown in a table 5. A codebook used by four antenna ports and three transmission layers (corresponding to the CP-OFDM) is as shown in a table 6. A codebook used by four antenna ports and four transmission layers (corresponding to the CP-OFDM) is as shown in a table 7.

TABLE 1

| TPMI index | W (Sorting from left to right based on an increasing order of the TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

TABLE 2

| TPMI index | W (Sorting from left to right based on an increasing order of the TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

TABLE 3

| TPMI index | W (Sorting from left to right based on an increasing order of the TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

TABLE 4

| TPMI index | W (Sorting from left to right based on an increasing order of the TPMI index) | | |
|---|---|---|---|
| 0-2 | $\frac{1}{\sqrt{2}}\begin{bmatrix} 1 & 0 \\ 0 & 1 \end{bmatrix}$ | $\frac{1}{2}\begin{bmatrix} 1 & 1 \\ 1 & -1 \end{bmatrix}$ | $\frac{1}{2}\begin{bmatrix} 1 & 1 \\ j & -j \end{bmatrix}$ |

TABLE 5

| TPMI index | W (Sorting from left to right based on an increasing order of the TPMI index) | | | |
|---|---|---|---|---|
| 0-3 | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 1 \\ 0 & 0 \end{bmatrix}$ |
| 4-7 | $\frac{1}{2}\begin{bmatrix} 0 & 0 \\ 1 & 0 \\ 0 & 0 \\ 0 & 1 \end{bmatrix}$ | $\frac{1}{2}\begin{bmatrix} 0 & 0 \\ 0 & 0 \\ 1 & 0 \\ 0 & 1 \end{bmatrix}$ | $\frac{1}{2}\begin{bmatrix} 1 & 0 \\ 0 & 1 \\ 1 & 0 \\ 0 & -j \end{bmatrix}$ | $\frac{1}{2}\begin{bmatrix} 1 & 0 \\ 0 & 1 \\ 1 & 0 \\ 0 & j \end{bmatrix}$ |
| 8-11 | $\frac{1}{2}\begin{bmatrix} 1 & 0 \\ 0 & 1 \\ -j & 0 \\ 0 & 1 \end{bmatrix}$ | $\frac{1}{2}\begin{bmatrix} 1 & 0 \\ 0 & 1 \\ -j & 0 \\ 0 & -1 \end{bmatrix}$ | $\frac{1}{2}\begin{bmatrix} 1 & 0 \\ 0 & 1 \\ -1 & 0 \\ 0 & -j \end{bmatrix}$ | $\frac{1}{2}\begin{bmatrix} 1 & 0 \\ 0 & 1 \\ -1 & 0 \\ 0 & j \end{bmatrix}$ |
| 12-15 | $\frac{1}{2}\begin{bmatrix} 1 & 0 \\ 0 & 1 \\ j & 0 \\ 0 & 1 \end{bmatrix}$ | $\frac{1}{2}\begin{bmatrix} 1 & 0 \\ 0 & 1 \\ j & 0 \\ 0 & -1 \end{bmatrix}$ | $\frac{1}{2\sqrt{2}}\begin{bmatrix} 1 & 1 \\ 1 & 1 \\ 1 & -1 \\ 1 & -1 \end{bmatrix}$ | $\frac{1}{2\sqrt{2}}\begin{bmatrix} 1 & 1 \\ 1 & 1 \\ j & -j \\ j & -j \end{bmatrix}$ |
| 16-19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20-21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ j & -1 \end{bmatrix}$ | — | — |

TABLE 6

| TPMI index | W (Sorting from left to right based on an increasing order of the TPMI index) | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

TABLE 7

| TPMI index | W (Sorting from left to right based on an increasing order of the TPMI index) |
|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ — — — |

At this stage, a 2-antenna port codebook and a 4-antenna port codebook are supported. However, a terminal of a Customer Premise Equipment (CPE) type generally has eight antennas. In order to support an uplink codebook transmission of the terminal of such type, a codebook of eight antenna ports is required to be introduced. How to design the codebook of the eight antenna ports to cause such terminal to obtain a desire transmission performance is a problem to be solved. Uplink codebooks at this stage are all designed based on a single antenna array panel, which are not applicable for the terminal of the CPE type employing multiple-panels antenna configuration. Thus, an 8-antenna port codebook cannot be obtained by expanding the 2-antenna port codebook and the 4-antenna port codebook. When a downlink 8-antenna port codebook is reused, a large amount of DCI overheads is required to indicate a corresponding TPMI, which may obviously affect a sounding performance of the DCI.

Based on the above problem, the present disclosure provides a design scheme of the uplink codebook. The PUSCH is transmitted though selecting antenna ports corresponding to adjacent polarization antenna pairs, such that the transmission power is concentrated on a part of antenna ports having the best transmission performance. In this way, the performance of the uplink transmission is improved. Meanwhile, a relative phase between polarization antenna pairs is introduced, which may further improve the performance of the codebook transmission.

The technical solutions of the present disclosure are described in detail below through some embodiments.

FIG. 3 is a schematic flowchart of a wireless communication method 200 according to some embodiments of the present disclosure. As shown in FIG. 3, the wireless communication method 200 may include at least part of the following contents.

At block S210, the method may include determining, by the terminal device, a precoding matrix from a preconfigured codebook based on one or more Transmit Precoding Matrix Indicator (TPMI) indicated by a network device. The precoding matrix includes N rows, N is a multiple of 2 and greater than 4. The precoding matrix satisfies a first condition or a second condition, the first condition is that each column of the precoding matrix includes two non-zero elements, and the second condition is that each column of the precoding matrix includes four non-zero elements.

At block S220, the method may include employing, by the terminal device, the precoding matrix to precode data.

At block S230, the method may include transmitting, by the terminal device, precoded data.

In the embodiments of the present disclosure, the terminal device only transmits the data on antenna ports corresponding to non-zero elements and do not transmit the data on antenna ports corresponding to the zero elements.

In the embodiments of the present disclosure, N is the multiple of 2 and greater than 4. That is, the precoding matrix may correspond to a codebook which supports that the number of antenna ports is greater than 4. Further, each column of the precoding matrix satisfies the first condition or the second condition. That is, the transmitting power may be concentrated on the part of antenna ports having the highest efficiency, such that the performance of the uplink transmission may be improved.

In the embodiments of the present disclosure, when the terminal device is configured with multiple pairs of polarization antennas or multiple panels, only ports corresponding to one pair of polarization antennas (or one panel) facing the network device or ports corresponding to two adjacent groups of polarization antennas (or two panels) may be employed to transmit the uplink data, such that the power is concentrated on the part of antenna ports having the highest efficiency. In this way, the performance of the uplink transmission may be improved. Meanwhile, when the terminal device does not support a coherent transmission, an antenna port in which a coherent relationship exists may also be selected to transmit the data based on the present disclosure.

In some embodiments, N=2n. n is an integer greater than 2, e.g., N=4, 6, 8, 10, 12, 14, . . . , 2n.

In some embodiments, N=6. That is, the precoding matrix may correspond to a codebook which supports that the number of antenna ports is 6.

In some embodiments, N=8. That is, the precoding matrix may correspond to a codebook which supports that the number of antenna ports is 8.

In some embodiments, N=12. That is, the precoding matrix may correspond to a codebook which supports that the number of antenna ports is 12.

In some embodiments, N=16. That is, the precoding matrix may correspond to a codebook which supports that the number of antenna ports is 16.

In some embodiments, N=32. That is, the precoding matrix may correspond to a codebook which supports that the number of antenna ports is 32.

Of course, N may also take other values, which is not limited in the present disclosure.

In some embodiments, limitations for the precoding matrix in the embodiments of the present disclosure may only be applicable to a part of codewords in the preconfigured codebook. In other words, as long as a part of codewords in the preconfigured codebook satisfy a limitation condition of the present disclosure, all codewords are not required to satisfy the limitations of the present disclosure.

In some embodiments, the preconfigured codebook may be preconfigured by the network device. Alternatively, the preconfigured codebook may be agreed on a protocol.

In some embodiments, before the block S210, the terminal device transmits an SRS configured for the uplink codebook transmission. The SRS is configured for the network device to determine the one or more TPMI. That is, the network device may determine the one or more TPMIs based on the SRS configured for the uplink codebook transmission.

In some embodiments, the SRS is an SRS of N antenna ports. That is, an SRS resource of the SRS is configured with the N antenna ports. In addition, usage of the SRS resource is configured as a codebook.

In some embodiments, a part of information of the precoding matrix is indicated through a TPMI of a wideband in the one or more TPMIs, and the other part of the information of the precoding matrix is indicated through a TPMI of a sub band in the one or more TPMI.

In some embodiments, non-zero elements in different columns of the precoding matrix having different locations.

In some embodiments, the non-zero elements in the different columns of the precoding matrix having the same locations.

In some embodiments, the first condition is that each column of the precoding matrix includes the two non-zero elements and the two non-zero elements correspond to different antenna ports of a pair of polarization antennas.

In some embodiments, the second condition is that each column of the precoding matrix includes the four non-zero elements and the four non-zero elements correspond to different antenna ports of two adjacent pairs of polarization antennas.

In some embodiments, it is assumed in the present disclosure that a sorting manner of antenna ports is that antenna ports in a polarization direction is first sorted, and antenna ports in another polarization direction are then sorted. For example, when N=8, mapping relationships between antennas and antenna ports may be as shown in FIG. 4. When an actual arrangement manner of the antenna ports is different from the above assumption in the present disclosure, a port index described in the present disclosure is required to be modified accordingly to ensure that each of ports {0,4}, {1,5}, {2,6}, {3,7} correspond to a pair of polarization antennas, or that each of the $\{1^{st},5^{th}\}$ elements, the $\{2^{nd},6^{th}\}$ elements, the $\{3^{rd},7^{th}\}$ elements, and the $\{4^{th},8^{th}\}$ elements of the precoding matrix correspond to one pair of polarization antennas. In addition, the $M^{th}$ row of the precoding matrix, i.e., forming by the $M^{th}$ element of each column, corresponds to an antenna port M−1.

In some embodiments, the mapping relationships between antennas and antenna ports may also be as shown in FIG. 5. That is, the sorting manner of the antenna ports is to arrange in sequence in accordance with polarization antenna pairs. Namely, each of antenna ports {0,1}, {2,3}, {4,5}, and {6,7} corresponds to one pair of polarization antennas, or each of the $\{1^{st},2^{nd}\}$ elements, the $\{3^{rd},4^{th}\}$ elements, the $\{5^{th},6^{th}\}$ elements, and the $\{7^{th},8^{th}\}$ elements of the precoding matrix correspond to one pair of polarization antennas.

In some embodiments, the two non-zero elements in the first condition are the $k^{th}$ element and the $[k+N/2]^{th}$ element, respectively, in one column. k is a positive integer less than or equal to N/2.

Since mapping between a physical antenna and an antenna port is uncertain, a corresponding relationship between an antenna port and the precoding matrix may be considered only, the first condition in the block S210 may also be described as the first condition being that each column of the precoding matrix includes the two non-zero elements and the two non-zero elements being the $k^{th}$ element and the $[k+N/2nd]^{th}$ element, respectively, in the one column.

In some embodiments, for a precoding matrix satisfying the first condition, the non-zero elements in the different columns may have the different locations.

For example, when N=6, corresponding to the mapping relationships shown as in FIG. 4, the $\{1^{st},4^{th}\}$ elements of the $i^{th}$ column of the precoding matrix are non-zero and the other elements are zero, and the $\{2^{nd},5^{th}\}$ elements of the $(i+1)^{th}$ column of the precoding matrix are non-zero and the other elements are zero.

For another example, when N=8, corresponding to the mapping relationships as shown in FIG. 4, the $\{1^{st},5^{th}\}$ elements of the $i^{th}$ column of the precoding matrix are non-zero and the other elements are zero; the $\{2^{nd},6^{th}\}$ elements of the $(i+1)^{th}$ column of the precoding matrix are non-zero and the other elements are zero.

In some embodiments, for the precoding matrix satisfying the first condition, the non-zero elements in the different columns may have the same locations.

For example, when N=6, corresponding to the mapping relationships as shown in FIG. 4, the $\{1^{st},4^{th}\}$ elements of each column of the precoding matrix are non-zero and the other elements are zero. Alternatively, $\{2^{nd},5^{th}\}$ elements of each column of the precoding matrix are non-zero and the other elements are zero. Alternatively, $\{3^{rd},6^{th}\}$ elements of each column of the precoding matrix are non-zero and the other elements are zero.

For another example, when N=8, corresponding to the mapping relationships as shown in FIG. 4, the $\{1^{st},5^{th}\}$ elements of each column of the precoding matrix are non-zero and the other elements are zero. Alternatively, the $\{2^{nd},6^{th}\}$ elements of each column of the precoding matrix are non-zero and the other elements are zero. Alternatively, the $\{3^{rd},7^{th}\}$ elements of each column of the precoding matrix are non-zero and the other elements are zero. Alternatively, the $\{4^{th},8^{th}\}$ elements of each column of the precoding matrix are non-zero and the other elements are zero.

In some embodiments, the four non-zero elements in the second condition are the $m^{th}$ element, the $[(m \bmod N/2)+1]^{th}$ element, the $[m+N/2]^{th}$ element, and the $[(m \bmod N/2)+N/2+1]^{th}$ element, respectively, in one column. m is a positive integer less than or equal to N/2, and mod indicates a modulus operation.

Since the mapping between physical antennas and antenna ports is uncertain, the corresponding relationships between the antenna ports and the precoding matrix may be considered only, the second condition in the block S210 may also be described as the second condition being that each column of the precoding matrix includes the four non-zero elements and the four non-zero elements being the $m^{th}$ element, the $[(m \bmod N/2)+1]^{th}$ element, the $[m+N/2]^{th}$ element, and the $[(m \bmod N/2)+N/2+1]^{th}$ element, respectively, in one column. The m is the positive integer less than or equal to N/2, and mod indicates the modulus operation.

For example, in a case of N=8, corresponding to the mapping relationships as shown in FIG. 4, when m=1, the four non-zero elements are the $\{1^{st},2^{nd},5^{th},6^{th}\}$ elements of one column; when m=2, the four non-zero elements are the $\{2^{nd},3^{rd},6^{th},7^{th}\}$ elements of the column; when m=3, the four non-zero elements are the $\{3^{rd},4^{th},7^{th},8^{th}\}$ elements of the column; when m=4, the four non-zero elements are the $\{1^{st},4^{th},5^{th},8^{th}\}$ elements of the column.

In some embodiments, the $m^{th}$ element is obtained by multiplying a first element in a first vector by a first weight value, the $[m+N/2]^{th}$ element is obtained by multiplying a second element in the first vector by the first weight value, and the first weight value is a real or imaginary or complex number; and/or the $[(m \bmod N/2)+1]^{th}$ element is obtained by multiplying a first element in a second vector by a second weight value, the $[(m \bmod N/2)+N/2+1]^{th}$ element is obtained by multiplying a second element in the second vector by the second weight value, and the second weight value is a real or imaginary or complex number.

In some embodiments, both the first vector and the second vector are 2×1 vectors.

In some embodiments, this first vector v1 indicates weight values of different antenna ports in one pair of polarization antennas, while the second vector v2 indicates weight values of different antenna ports in another pair of polarization antennas. [w1 w2] indicates a relative phase (a weight valued value) between the two pairs of polarization antennas, w1 indicates the first weight value, and w2 indicates the second weight value.

For example, in the case of N=8, corresponding to the mapping relationships as shown in FIG. 4, if $$v1 = \begin{bmatrix} 1 \\ 1 \end{bmatrix}, v2 = \begin{bmatrix} 1 \\ -1 \end{bmatrix}, [w1 \ w2] = [1 \ j], m = 1,$$

the precoding matrix includes one column, then the precoding matrix may be indicated as $$\frac{1}{2}\begin{bmatrix} 1 \\ j \\ 0 \\ 0 \\ 1 \\ -j \\ 0 \\ 0 \end{bmatrix} \cdot \frac{1}{2}$$

is a power normalization coefficient.

In some embodiments, weight values of different antenna ports in a polarization antenna pair are indicated through the TPMI of the wideband. That is, the weight values are the same in an entire transmission bandwidth. Phases between polarization antenna pairs are indicated by one or more TPMI of sub bands. That is, phases on different sub bands may be different.

In some embodiments, the weight values of different antenna ports in the polarization antenna pair are indicated through the TPMI of the sub band. That is, weight values on different sub bands may be different. The phases between the polarization antenna pairs are indicated by the TPMI of the wideband. That is, the phases are the same on the entire transmission bandwidth.

In some embodiments, the first vector and the second vector are indicated by the TPMI of the wideband in the one or more TPMI, and the first weight value and the second weight value are indicated by the TPMI of the sub band in the one or more TPMI. That is, the first vector and the second vector are the same on the entire transmission bandwidth, and first weight values and second weight values on different sub bands may be different.

In some embodiments, the first vector and the second vector are indicated by the TPMI of the sub band in the one or more TPMI, while the first weight value and the second weight value are indicated by the TPMI of the wideband in the one or more TPMI.

In some embodiments, the TPMI of the wideband and the TPMI of the sub band may be indicated to the terminal device through the same DCI.

In some embodiments, for a precoding matrix satisfying the second condition, the non-zero elements in the different columns may have the different locations. For example, when N=8, corresponding to the mapping relationships as shown in FIG. 4, the $\{1^{st},2^{nd},5^{th},6^{th}\}$ elements of the $i^{th}$ column of the precoding matrix are non-zero and the other elements are zero, and the $\{2^{nd},3^{rd},6^{th},7^{th}\}$ elements of the $(i+1)^{th}$ column of the precoding matrix are non-zero and the other elements are zero.

In some embodiments, for a precoding matrix satisfying the first condition, the non-zero elements in the different columns have the same locations. For example, when N=8, corresponding to the mapping relationships as shown in FIG. 4, the $\{1^{st},2^{nd},5^{th},6^{th}\}$ elements of each column of the precoding matrix are non-zero and the other elements are zero; or the $\{2^{nd},3^{rd},6^{th},7^{th}\}$ elements of each column of the precoding matrix are non-zero and the other elements are zero; or, the $\{3^{rd},4^{th},7^{th},8^{th}\}$ elements of each column of the precoding matrix are non-zero and the other elements are zero; or, the $\{1^{st},4^{th},5^{th},8^{th}\}$ elements of each column of the precoding matrix are non-zero and the other elements are zero.

In the following embodiments, examples of the precoding matric are based on the eight antenna ports, precoding matrices of antenna ports having other numbers (e.g., 6, 12, 16, etc.) may be generated through the same method.

In some embodiments, the preconfigured codebook includes a first precoding matrix. The first precoding matrix only includes one column and satisfies the first condition. That is, the two non-zero elements are included and correspond to the different antenna ports of one pair of polarization antennas.

For example, in the case of N=8, corresponding to the mapping relationships as shown in FIG. 4, the first precoding matrix may be $$\frac{1}{\sqrt{2}}\begin{bmatrix} 1 \\ 0 \\ 0 \\ 0 \\ j \\ 0 \\ 0 \\ 0 \end{bmatrix}, \text{or } \frac{1}{\sqrt{2}}\begin{bmatrix} 0 \\ 1 \\ 0 \\ 0 \\ 0 \\ 0 \\ 1 \\ 0 \end{bmatrix}, \text{or } \frac{1}{\sqrt{2}}\begin{bmatrix} 0 \\ 0 \\ 1 \\ 0 \\ 0 \\ 0 \\ -1 \\ 0 \end{bmatrix}, \text{or } \frac{1}{\sqrt{2}}\begin{bmatrix} 0 \\ 0 \\ 0 \\ 1 \\ 0 \\ 0 \\ 0 \\ -j \end{bmatrix} \cdot \frac{1}{\sqrt{2}}$$

is the power normalization coefficient. In a case of N=6, corresponding to the mapping relationships as shown in FIG. 4, the first precoding matrix may be $$\frac{1}{\sqrt{2}}\begin{bmatrix} 1 \\ 0 \\ 0 \\ j \\ 0 \\ 0 \end{bmatrix}, \text{or } \frac{1}{\sqrt{2}}\begin{bmatrix} 0 \\ 1 \\ 0 \\ 0 \\ 1 \\ 0 \end{bmatrix}, \text{or } \frac{1}{\sqrt{2}}\begin{bmatrix} 0 \\ 0 \\ 1 \\ 0 \\ 0 \\ -1 \end{bmatrix} \cdot \frac{1}{\sqrt{2}}$$

is the power normalization coefficient.

In some embodiments, the preconfigured codebook includes a second precoding matrix. The second precoding matrix includes multiple columns (i.e., a rank is greater than 1) and each of the multiple columns satisfies the first condition. However, the non-zero elements in the different columns have the different locations.

For example, in the case of N=8, corresponding to the mapping relationships as shown in FIG. 4, the second precoding matrix may be $$\frac{1}{2}\begin{bmatrix} 1 & 0 \\ 0 & 1 \\ 0 & 0 \\ 0 & 0 \\ -1 & 0 \\ 0 & j \\ 0 & 0 \\ 0 & 0 \end{bmatrix}, \text{ or } \frac{1}{2}\begin{bmatrix} 0 & 0 \\ 0 & 0 \\ 0 & 1 \\ 1 & 0 \\ 0 & 0 \\ 0 & 0 \\ 0 & -j \\ 1 & 0 \end{bmatrix} \cdot \frac{1}{2}$$

is the power normalization coefficient.

In some embodiments, the preconfigured codebook includes a third precoding matrix. The third precoding matrix includes multiple columns and each of the multiple columns satisfies the first condition. However, the non-zero elements in the different columns have the same locations.

For example, in a case of N=8, corresponding to the mapping relationships as shown in FIG. 4, the third precoding matrix may be $$\frac{1}{2}\begin{bmatrix} 1 & 1 \\ 0 & 0 \\ 0 & 0 \\ 0 & 0 \\ -1 & j \\ 0 & 0 \\ 0 & 0 \\ 0 & 0 \end{bmatrix}, \text{ or } \frac{1}{2}\begin{bmatrix} 0 & 0 \\ 0 & 0 \\ 0 & 0 \\ 1 & 1 \\ 0 & 0 \\ 0 & 0 \\ 0 & 0 \\ -j & -1 \end{bmatrix} \cdot \frac{1}{2}$$

is the power normalization coefficient.

In some embodiments, the preconfigured codebook includes a fourth precoding matrix. The fourth precoding matrix only include one column and the column satisfies the second condition. That is, the four non-zero elements are included and correspond to different antenna ports of two adjacent pairs of polarization antennas.

For example, in a case of N=8, corresponding to the mapping relationships as shown in FIG. 4, the fourth precoding matrix may be $$\frac{1}{2}\begin{bmatrix} 1 \\ 1 \\ 0 \\ 0 \\ j \\ -j \\ 0 \\ 0 \end{bmatrix}, \text{ or } \frac{1}{2}\begin{bmatrix} 0 \\ 1 \\ 1 \\ 0 \\ 0 \\ 1 \\ -1 \\ 0 \end{bmatrix}, \text{ or } \frac{1}{2}\begin{bmatrix} 0 \\ 0 \\ 1 \\ -1 \\ 0 \\ 0 \\ -1 \\ j \end{bmatrix}, \text{ or } \frac{1}{2}\begin{bmatrix} 1 \\ 0 \\ 0 \\ 1 \\ j \\ 0 \\ 0 \\ -j \end{bmatrix} \cdot \frac{1}{2}$$

is the power normalization coefficient.

In some embodiments, the preconfigured codebook includes a fifth precoding matrix. The fifth precoding matrix includes multiple columns and each of the multiple columns satisfies the second condition. That is, the four non-zero elements are included and correspond to different antenna ports of two adjacent pairs of polarization antennas. However, the non-zero elements in the different columns may have the different locations.

For example, in the case of N=8, corresponding to the mapping relationships as shown in FIG. 4, the fifth precoding matrix may be $$\frac{1}{2\sqrt{2}}\begin{bmatrix} 1 & 0 \\ 1 & 1 \\ 0 & 1 \\ 0 & 0 \\ 1 & 0 \\ 1 & -1 \\ 0 & -1 \\ 0 & 0 \end{bmatrix} \text{ and } \frac{1}{2\sqrt{2}}$$

is the power normalization coefficient; or may be $$\frac{1}{2\sqrt{3}}\begin{bmatrix} 1 & 1 & 0 \\ -1 & 1 & 0 \\ 0 & 0 & 1 \\ 0 & 0 & -1 \\ -j & j & 0 \\ -j & j & 0 \\ 0 & 0 & -j \\ 0 & 0 & j \end{bmatrix} \text{ and } \frac{1}{2\sqrt{3}}$$

is the power normalization coefficient; and may be $$\frac{1}{4}\begin{bmatrix} 1 & 1 & 0 & 0 \\ 1 & -1 & 0 & 0 \\ 0 & 0 & 1 & 1 \\ 0 & 0 & 1 & -1 \\ j & j & 0 & 0 \\ j & -j & 0 & 0 \\ 0 & 0 & -j & -j \\ 0 & 0 & j & j \end{bmatrix} \text{ and } \frac{1}{4}$$

is the power normalization coefficient.

In some embodiments, the preconfigured codebook includes a sixth precoding matrix. The sixth precoding matrix includes multiple columns and each of the multiple columns satisfies the second condition. In addition, the non-zero elements in the different columns have the same locations.

For example, in the case of N=8, corresponding to the mapping relationships as shown in FIG. 4, the sixth precoding matrix may be $$\frac{1}{2\sqrt{2}}\begin{bmatrix} 1 & 1 \\ 1 & 1 \\ 0 & 0 \\ 0 & 0 \\ j & -j \\ j & -j \\ 0 & 0 \\ 0 & 0 \end{bmatrix} \text{ and } \frac{1}{2\sqrt{2}}$$

is the power normalization coefficient; or may be $$\frac{1}{2\sqrt{3}}\begin{bmatrix} 0 & 0 & 0 \\ 0 & 0 & 0 \\ 1 & 1 & 1 \\ 1 & -1 & 1 \\ 0 & 0 & 0 \\ 0 & 0 & 0 \\ j & j & -j \\ j & -j & -j \end{bmatrix} \text{ and } \frac{1}{2\sqrt{3}}$$

is the power normalization coefficient; or may be $$\frac{1}{4}\begin{bmatrix} 1 & 1 & 1 & 1 \\ 0 & 0 & 0 & 0 \\ 0 & 0 & 0 & 0 \\ 1 & -1 & 1 & -1 \\ 1 & 1 & -1 & -1 \\ 0 & 0 & 0 & 0 \\ 0 & 0 & 0 & 0 \\ 1 & -1 & -1 & 1 \end{bmatrix} \text{ and } \frac{1}{4}$$

is the power normalization coefficient. For example, in a case of N=6, corresponding to the mapping relationships as shown in FIG. 4, the sixth precoding matrix may be $$\frac{1}{2\sqrt{2}}\begin{bmatrix} 1 & 1 \\ 1 & 1 \\ 0 & 0 \\ j & -j \\ j & -j \\ 0 & 0 \end{bmatrix} \text{ and } \frac{1}{2\sqrt{2}}$$

is the power normalization coefficient; or may be $$\frac{1}{2\sqrt{3}}\begin{bmatrix} 0 & 0 & 0 \\ 1 & 1 & 1 \\ 1 & -1 & 1 \\ 0 & 0 & 0 \\ j & j & -j \\ j & -j & -j \end{bmatrix} \text{ and } \frac{1}{2\sqrt{3}}$$

is the power normalization coefficient; or may be $$\frac{1}{4}\begin{bmatrix} 1 & 1 & 1 & 1 \\ 0 & 0 & 0 & 0 \\ 1 & -1 & 1 & -1 \\ 1 & 1 & -1 & -1 \\ 0 & 0 & 0 & 0 \\ 1 & -1 & -1 & 1 \end{bmatrix} \text{ and } \frac{1}{4}$$

is the power normalization coefficient.

In some embodiments, the preconfigured codebook includes a seventh precoding matrix. In the case of N=8, corresponding to the mapping relationships as shown in FIG. 4, the $\{1^{st},5^{th}\}$ elements of each column of the seventh precoding matrix are non-zero, and the other elements are 0; or, corresponding to the mapping relationships shown in FIG. 5, the $\{1^{st},2^{nd}\}$ elements of each column of the seventh precoding matrix are non-zero, and the other elements are 0.

In some embodiments, the preconfigured codebook includes an eighth precoding matrix. In the case of N=8, corresponding to the mapping relationships as shown in FIG. 4, the $\{2^{nd},6^{th}\}$ elements of each column of the eighth precoding matrix are non-zero, and the other elements are 0; or, corresponding to the mapping relationships shown in FIG. 5, the $\{3^{rd},4^{th}\}$ elements of each column of the eighth precoding matrix are non-zero, and the other elements are 0.

In some embodiments, the preconfigured codebook includes a ninth precoding matrix. In the case of N=8, corresponding to the mapping relationships as shown in FIG. 4, the $\{3^{rd},7^{th}\}$ elements of each column of the ninth precoding matrix are non-zero, and the other elements are 0; or, corresponding to the mapping relationships shown in FIG. 5, the $\{5^{th},6^{th}\}$ elements of each column of the ninth precoding matrix are non-zero, and the other elements are 0.

In some embodiments, the preconfigured codebook includes a tenth precoding matrix. In the case of N=8, corresponding to the mapping relationships as shown in FIG. 4, the $\{4^{th},8^{th}\}$ elements of each column of the tenth precoding matrix are non-zero, and the other elements are 0; or, corresponding to the mapping relationships shown in FIG. 5, the $\{7^{th},8^{th}\}$ elements of each column of the tenth precoding matrix are non-zero, and the other elements are 0.

In some embodiments, the preconfigured codebook includes an eleventh precoding matrix. In the case of N=8, corresponding to the mapping relationships as shown in FIG. 4, the $\{1^{st},2^{nd},5^{th},6^{th}\}$ elements of each column of the eleventh precoding matrix are non-zero, and the other elements are 0; or, corresponding to the mapping relationships shown in FIG. 5, $\{1^{st},2^{nd},3^{rd},4^{th}\}$ elements of each column of the eleventh precoding matrix are non-zero, and the other elements are 0.

In some embodiments, the preconfigured codebook includes a twelfth precoding matrix. In the case of N=8, corresponding to the mapping relationships as shown in FIG. 4, the $\{2^{nd},3^{rd},6^{th},7^{th}\}$ elements of each column of the twelfth precoding matrix are non-zero, and the other elements are 0; or, corresponding to the mapping relationships shown in FIG. 5, the $\{3^{rd},4^{th},5^{th},6^{th}\}$ elements of each column of the twelfth precoding matrix are non-zero, and the other elements are 0.

In some embodiments, the preconfigured codebook includes a thirteenth precoding matrix. In the case of N=8, corresponding to the mapping relationships as shown in FIG. 4, the $\{3^{rd},4^{th},7^{th},8^{th}\}$ elements of each column of the thirteenth precoding matrix are non-zero, and the other elements are 0; or, corresponding to the mapping relationships shown in FIG. 5, the $\{5^{th},6^{th},7^{th},8^{th}\}$ elements of each column of the thirteenth precoding matrix are non-zero, and the other elements are 0.

In some embodiments, the preconfigured codebook includes a fourteenth precoding matrix. In the case of N=8, corresponding to the mapping relationships as shown in FIG. 4, the $\{1^{st},4^{th},5^{th},8^{th}\}$ elements of each column of the fourteenth precoding matrix are non-zero, and the other elements are 0; or, corresponding to the mapping relationships shown in FIG. 5, the $\{1^{st},2^{nd},7^{th},8^{th}\}$ elements of each column of the fourteenth precoding matrix are non-zero, and the other elements are 0.

In some embodiments, when the network device configures a codebook subset constraint (CSR) for the terminal device, the CSR only constrains antenna ports in one polarization antenna pair.

For example, the preconfigured codebook includes a first codeword set, a second codeword set, and a third codeword set. Elements on antenna ports corresponding to a first polarization antenna pair in the first codeword set are non-zero, and elements on other antenna ports are 0. Elements on antenna ports corresponding to a second polarization antenna pair in the second codeword set are non-zero, and elements on other antenna ports are 0. Elements on antenna ports corresponding to a first polarization antenna pair and the second polarization antenna pair in the second codeword set are non-zero, and elements on other antenna ports are 0. When the CSR is configured, a constrained code subset is the first codeword set or the second codeword set, that is, it only contains codewords with non-zero antenna ports of one polarized antenna group.

In the embodiments of the present disclosure, when the terminal device is configured with multiple pairs of polarization antennas or multiple panels, only the ports corresponding to one pair of polarization antennas (or one panel) facing the network device or the ports corresponding to the two adjacent pairs of the polarization antennas (or the two panels) may be employed to transmit the uplink data, such that the power is concentrated on the part of antenna ports having the highest efficiency. In this way, the performance of the uplink transmission may be improved. Meanwhile, when the terminal device does not support the coherent transmission, the antenna port in which the coherent relationship exists may also be selected to transmit the data based on the present disclosure.

Therefore, in the embodiments of the present disclosure, the codebook which supports that the number of the antenna ports is greater than 4 is designed, which may concentrate the power on the part of antenna ports having the highest efficiency, such that the performance of the uplink transmission may be improved.

The embodiments at a terminal device side of the present disclosure are described in detail with reference to FIGS. 3 to 5 above. Embodiments at a network device side of the present disclosure is described in detail below with reference to FIG. 6. It should be understood that the embodiments at the network device side and the embodiments at the terminal device side correspond to each other, and similar descriptions of the embodiments at the network device side may refer to those of the embodiments at the terminal device side.

FIG. 6 is a schematic flowchart of another wireless communication method 300 according to some embodiments of the present disclosure. As shown in FIG. 6, the wireless communication method 300 may include at least a part of the following contents.

At block S310, the method may include determining, by the network device, the precoding matrix from the preconfigured codebook. The precoding matrix includes N rows, N is a multiple of 2 and greater than 4. The precoding matrix satisfies the first condition or the second condition. The first condition is that each column of the precoding matrix includes two non-zero element. The second condition is that each column of the precoding matrix includes four non-zero elements.

At block S320, the method may include transmitting, by the network device, one or more Transmit Precoding Matrix Indicator (TPMI) corresponding to the precoding matrix to the terminal device. The one or more TPMI are configured for the terminal device to determine the precoding matrix from the preconfigured codebook.

In the embodiments of the present disclosure, the terminal device only transmits the data on an antenna port corresponding to a non-zero element, and does not transmit the data on an antenna port corresponding to a zero element.

In the embodiments of the present disclosure, N is the multiple of 2 and greater than 4. That is, the precoding matrix may correspond to the codebook which supports that the number of antenna ports is greater than 4. Further, each column of the precoding matrix satisfies the first condition or the second condition. That is, the transmitting power may be concentrated on the antenna ports having the highest efficiency, such that the performance of the uplink transmission may be improved.

In the embodiments of the present disclosure, when the terminal device is configured with the multiple pairs of polarization antennas or the multiple panels, only the ports corresponding to one pair of polarization antennas (or one panel) facing the network device or the ports corresponding to the two adjacent pairs of polarization antennas (or the two panels) may be employed to transmit the uplink data, such that the power is concentrated on the part of antenna ports having the highest efficiency. In this way, the performance of the uplink transmission may be improved. Meanwhile, when the terminal device does not support the coherent transmission, the antenna port in which the coherent relationship exists may also be selected to transmit the data based on the present disclosure.

In some embodiments, N=2n. n is an integer greater than 2, e.g., N=4, 6, 8, 10, 12, 14, . . . , 2n.

In some embodiments, N=6. That is, the precoding matrix may correspond to the codebook which supports that the number of antenna ports is 6.

In some embodiments, N=8. That is, the precoding matrix may correspond to the codebook which supports that the number of antenna ports is 8.

In some embodiments, N=12. That is, the precoding matrix may correspond to the codebook which supports that the number of antenna ports is 12.

In some embodiments, N=16. That is, the precoding matrix may correspond to the codebook which supports that the number of antenna ports is 16.

In some embodiments, N=32. That is, the precoding matrix may correspond to the codebook which supports that the number of antenna ports is 32.

Of course, N may also take other values, which is not limited in the present disclosure.

In some embodiments, the limitations for the precoding matrix in the embodiments of the present disclosure may only be applicable to the part of codewords in the preconfigured codebook. In other words, as long as a part of codewords in the preconfigured codebook satisfy a limitation condition of the present disclosure, all codewords are not required to satisfy the limitations of the present disclosure.

In some embodiments, the preconfigured codebook may be preconfigured by the network device. Alternatively, the preconfigured codebook may be agreed on the protocol.

In some embodiments, before the block S320, the network device receives the SRS transmitted by the terminal device and configured for the uplink codebook transmission and determines the precoding matrix from the preconfigured codebook based on the SRS.

In some embodiments, before the block S320, the network device receives the SRS transmitted by the terminal device and configured for the uplink codebook transmission and determines the one or more TPMI based on the SRS.

In some embodiments, the SRS is the SRS of N antenna ports. That is, the SRS resource of the SRS is configured with the N antenna ports. In addition, the usage of the SRS resource is configured as the codebook.

In some embodiments, the part of information of the precoding matrix is indicated through the TPMI of the wideband in the one or more TPMI, and the other part of the information of the precoding matrix is indicated through the TPMI of the sub band in the one or more TPMI.

In some embodiments, the non-zero elements in the different columns of the precoding matrix having different locations.

In some embodiments, the non-zero elements in the different columns of the precoding matrix having the same locations.

In some embodiments, the first condition is that each column of the precoding matrix includes the two non-zero elements and the two non-zero elements correspond to different antenna ports of the pair of polarization antennas.

In some embodiments, the second condition is that each column of the precoding matrix includes the four non-zero elements and the four non-zero elements correspond to the different antenna ports of the two adjacent pairs of the polarization antennas.

In some embodiments, it is assumed in the present disclosure that the sorting manner of the antenna ports is that the antenna ports in one polarization direction is first sorted, and the antenna ports in another polarization direction are then sorted. For example, when N=8, the mapping relationships between the antennas and the antenna ports may be as shown in FIG. 4. When the actual arrangement manner of the antenna ports is different from the above assumption in the present disclosure, the port index described in the present disclosure is required to be modified accordingly to ensure that each of the ports {0,4}, {1,5}, {2,6}, {3,7} correspond to one pair of polarization antennas, or that each of the $\{1^{st},5^{th}\}$ elements, the $\{2^{nd},6^{th}\}$ elements, the $\{3^{rd},7^{th}\}$ elements, and the $\{4^{th},8^{th}\}$ elements of the precoding matrix correspond to one pair of polarization antennas. In addition, the $M^{th}$ row of the precoding matrix, i.e., forming by the $M^{th}$ element of each column, corresponds to the antenna port M−1.

In some embodiments, the mapping relationships between antennas and antenna ports may also be as shown in FIG. 5. That is, the sorting manner of the antenna ports is to arrange in sequence in accordance with the polarization antenna pairs. Namely, each of antenna ports {0,1}, {2,3}, {4,5}, and {6,7} corresponds to one pair of polarization antennas, or each of the $\{1^{st},2^{nd}\}$ elements, the $\{3^{rd},4^{th}\}$ elements, the $\{5^{th},6^{th}\}$ elements, and the $\{7^{th},8^{th}\}$ elements of the precoding matrix correspond to one pair of polarization antennas.

In some embodiments, the two non-zero elements in the first condition are the $k^{th}$ element and the $[k+N/2]^{th}$ element, respectively, in one column. k is the positive integer less than or equal to N/2.

Since the mapping between the physical antenna and the antenna port is uncertain, the corresponding relationship between the antenna port and the precoding matrix may be considered only, the first condition in the block S310 may also be described as the first condition being that each column of the precoding matrix includes the two non-zero elements and the two non-zero elements being the $k^{th}$ element and the $[k+N/2nd]^{th}$ element, respectively, in the one column.

In some embodiments, for a precoding matrix satisfying the first condition, the non-zero elements in the different columns may have the different locations.

For example, when N=6, corresponding to the mapping relationships as shown in FIG. 4, the $\{1^{st},4^{th}\}$ elements of the $i^{th}$ column of the precoding matrix are non-zero and the other elements are zero, and the $\{2^{nd},5^{th}\}$ elements of the $(i+1)^{th}$ column of the precoding matrix are non-zero and the other elements are zero.

For another example, when N=8, corresponding to the mapping relationships as shown in FIG. 4, the $\{1^{st},5^{th}\}$ elements of the $i^{th}$ column of the precoding matrix are non-zero and the other elements are zero; the $\{2^{nd},6^{th}\}$ elements of the $(i+1)^{th}$ column of the precoding matrix are non-zero and the other elements are zero.

In some embodiments, for the precoding matrix satisfying the first condition, the non-zero elements in the different columns may have the same locations.

For example, when N=6, corresponding to the mapping relationships as shown in FIG. 4, the $\{1^{st},4^{th}\}$ elements of each column of the precoding matrix are non-zero and the other elements are zero. Alternatively, the $\{2^{nd},5^{th}\}$ elements of each column of the precoding matrix are non-zero and the other elements are zero. Alternatively, the $\{3^{rd},6^{th}\}$ elements of each column of the precoding matrix are non-zero and the other elements are zero.

For another example, when N=8, corresponding to the mapping relationships as shown in FIG. 4, the $\{1^{st},5^{th}\}$ elements of each column of the precoding matrix are non-zero and the other elements are zero. Alternatively, the $\{2^{nd},6^{th}\}$ elements of each column of the precoding matrix are non-zero and the other elements are zero. Alternatively, the $\{3^{rd},7^{th}\}$ elements of each column of the precoding matrix are non-zero and the other elements are zero. Alternatively, the $\{4^{th},8^{th}\}$ elements of each column of the precoding matrix are non-zero and the other elements are zero.

In some embodiments, the four non-zero elements in the second condition are the $m^{th}$ element, the $[(m \bmod N/2)+1]^{th}$ element, the $[m+N/2]^{th}$ element, and the $[(m \bmod N/2)+N/2+1]^{th}$ element, respectively, in one column. m is the positive integer less than or equal to N/2, and mod indicates the modulus operation.

Since the mapping between the physical antenna and the antenna port is uncertain, the corresponding relationship between the antenna port and the precoding matrix may be considered only, the second condition in the block S210 may also be described as the second condition being that each column of the precoding matrix includes the four non-zero elements and the four non-zero elements being the $m^{th}$ element, the $[(m \bmod N/2)+1]^{th}$ element, the $[m+N/2]^{th}$ element, and the $[(m \bmod N/2)+N/2+1]^{th}$ element, respectively, in one column. The m is the positive integer less than or equal to N/2, and mod indicates the modulus operation.

For example, in a case of N=8, corresponding to the mapping relationships as shown in FIG. 4, when m=1, the four non-zero elements are the $\{1^{st},2^{nd},5^{th},6^{th}\}$ elements of one column; when m=2, the four non-zero elements are the $\{2^{nd},3^{rd},6^{th},7^{th}\}$ elements of the column; when m=3, the four non-zero elements are the $\{3^{rd},4^{th},7^{th},8^{th}\}$ elements of the column; when m=4, the four non-zero elements are the $\{1^{st},4^{th},5^{th},8^{th}\}$ elements of the column.

In some embodiments, the $m^{th}$ element is obtained by multiplying the first element in the first vector by the first weight value, the $[m+N/2]^{th}$ element is obtained by multiplying the second element in the first vector by the first weight value, and the first weight value is the real or imaginary or complex number; and/or the $[(m \bmod N/2)+1]^{th}$ element is obtained by multiplying the first element in the second vector by the second weight value, the $[(m \bmod N/2)+N/2+1]^{th}$ element is obtained by multiplying the second element in the second vector by the second weight value, and he second weight value is the real or imaginary or complex number.

In some embodiments, both the first vector and the second vector are the 2×1 vectors.

In some embodiments, this first vector v1 indicates the weight values of the different antenna ports in one pair of polarization antennas, while the second vector v2 indicates the weight values of the different antenna ports in another pair of polarization antennas. [w1 w2] indicates the relative phase (the weight valued value) between the two pairs of polarization antennas, w1 indicates the first weight value, and w2 indicates the second weight value.

For example, in the case of N=8, corresponding to the mapping relationships as shown in FIG. 4, if $$v1 = \begin{bmatrix} 1 \\ 1 \end{bmatrix}, v2 = \begin{bmatrix} 1 \\ -1 \end{bmatrix}, [w1\ w2] = [1\ j], m = 1,$$

the precoding matrix includes one column, then the precoding matrix may be indicated as $$\frac{1}{2}\begin{bmatrix} 1 \\ j \\ 0 \\ 0 \\ 1 \\ -j \\ 0 \\ 0 \end{bmatrix} \cdot \frac{1}{2}$$

is the power normalization coefficient.

In some embodiments, the weight values of different antenna ports in the polarization antenna pair are indicated through the TPMI of the wideband. That is, the weight values are the same in the entire transmission bandwidth. The phases between polarization antenna pairs are indicated by the one or more TPMI of sub bands. That is, the phases on the different sub bands may be different.

In some embodiments, the weight values of the different antenna ports in the polarization antenna pair are indicated through the TPMI of the sub band. That is, weight values on different sub bands may be different. The phases between the polarization antenna pairs are indicated by the TPMI of the wideband. That is, the phases are the same on the entire transmission bandwidth.

In some embodiments, the first vector and the second vector are indicated by the TPMI of the wideband in the one or more TPMI, and the first weight value and the second weight value are indicated by the TPMI of the sub band in the one or more TPMI. That is, the first vector and the second vector are the same on the entire transmission bandwidth, and the first weight values and the second weight values on different sub bands may be different.

In some embodiments, the first vector and the second vector are indicated by the TPMI of the sub band in the one or more TPMI, while the first weight value and the second weight value are indicated by the TPMI of the wideband in the one or more TPMI.

In some embodiments, the TPMI of the wideband and the TPMI of the sub band may be indicated to the terminal device through the same DCI.

In some embodiments, when the network device configures the CSR for the terminal device, the CSR only constrains the antenna ports in one polarization antenna pair.

For example, the preconfigured codebook includes the first codeword set, the second codeword set, and the third codeword set. The elements on the antenna ports corresponding to the first polarization antenna pair in the first codeword set are non-zero, and the elements on the other antenna ports are 0. The elements on antenna ports corresponding to the second polarization antenna pair in the second codeword set are non-zero, and the elements on the other antenna ports are 0. The elements on the antenna ports corresponding to the first polarization antenna pair and the second polarization antenna pair in the second codeword set are non-zero, and the elements on the other antenna ports are 0. When the CSR is configured, the constrained code subset is the first codeword set or the second codeword set, that is, only including codewords of non-zero antenna ports of one polarization antenna pair.

In some embodiments, the network device receives the data precoded by the precoding matrix transmitted by the terminal device.

In the embodiments of the present disclosure, when the terminal device is configured with the multiple pairs of polarization antennas or the multiple panels, only the ports corresponding to one pair of polarization antennas (or one panel) facing the network device or the ports corresponding to the two adjacent pairs of the polarization antennas (or the two panels) may be employed to transmit the uplink data, such that the power is concentrated on the part of antenna ports having the highest efficiency. In this way, the performance of the uplink transmission may be improved. Meanwhile, when the terminal device does not support the coherent transmission, the antenna port in which the coherent relationship exists may also be selected to transmit the data based on the present disclosure.

Therefore, in the embodiments of the present disclosure, the codebook which supports that the number of the antenna ports is greater than 4 is designed, which may concentrate the power on the part of antenna ports having the highest efficiency, such that the performance of the uplink transmission may be improved.

Method embodiments of the present disclosure are described in detail above in conjunction with FIGS. 3 to 6, and device embodiments of the present disclosure are described in detail below in conjunction with FIGS. 7 to 8. It should be understood that the device embodiments and the method embodiments correspond to each other, and similar descriptions of the device embodiments may refer to those of the method embodiments.

FIG. 7 illustrates a schematic block view of a terminal device 400 according to some embodiments of the present disclosure. As shown in FIG. 7, the terminal device 400 includes a processing unit 410 and a communication unit 420.

The processing unit 410 is configured to determine a precoding matrix from a preconfigured codebook based on one or more Transmit Precoding Matrix Indicator (TPMI) indicated by a network device; wherein the precoding matrix includes N rows, N is a multiple of 2 and greater than 4, the precoding matrix satisfies a first condition or a second condition, the first condition is that each column of the precoding matrix includes two non-zero elements, and the second condition is that each column of the precoding matrix includes four non-zero elements.

The processing unit 410 is further configured to employ the precoding matrix to precode data.

The communication unit 420 is configured to transmit precoded data.

In some embodiments, non-zero elements in different columns of the precoding matrix have the same locations.

In some embodiments, the first condition is that each column of the precoding matrix includes the two non-zero elements and the two non-zero elements correspond to different antenna ports of a pair of polarization antennas.

In some embodiments, the second condition is that each column of the precoding matrix includes the four non-zero elements and the four non-zero elements correspond to different antenna ports of two adjacent pairs of polarization antennas.

In some embodiments, the two non-zero elements in the first condition are the $k^{th}$ element and the $[k+N/2]^{th}$ element, respectively, in one column, and k is a positive integer less than or equal to N/2.

In some embodiments, in response to N being equal to 8, the $\{1^{st},5^{th}\}$ elements of each column of the precoding matrix are non-zero and the other elements are zero; or the $\{2^{nd},6^{th}\}$ elements of each column of the precoding matrix are non-zero and the other elements are zero; or the $\{3^{rd},7^{th}\}$ elements of each column of the precoding matrix are non-zero and the other elements are zero; or the $\{4^{th},8^{th}\}$ elements of each column of the precoding matrix are non-zero and the other elements are zero.

In some embodiments, the four non-zero elements in the second condition are the $m^{th}$ element, the $[(m \bmod N/2)+1]^{th}$ element, the $[m+N/2]^{th}$ element, and the $[(m \bmod N/2)+N/2+1]^{th}$ element, respectively, in one column, m is a positive integer less than or equal to N/2, and mod indicates a modulus operation.

In some embodiments, the $m^{th}$ element is obtained by multiplying a first element in a first vector by a first weight value, and the $[m+N/2]^{th}$ element is obtained by multiplying a second element in the first vector by the first weight value; and/or the $[(m \bmod N/2)+1]^{th}$ element is obtained by multiplying a first element in a second vector by a second weight value, and the $[(m \bmod N/2)+N/2+1]^{th}$ element is obtained by multiplying a second element in the second vector by the second weight value. Both the first vector and the second vector are 2×1 vectors, the first weight value is a real or imaginary or complex number, and the second weight value is a real or imaginary or complex number.

In some embodiments, the first vector and the second vector are indicated through a TPMI of a wideband in the one or more TPMI, and the first weight value and the second weight value are indicated through a TPMI of a sub band in the one or more TPMI; or the first vector and the second vector are indicated through a TPMI of a sub band in the one or more TPMI, and the first weight value and the second weight value are indicated through a TPMI of a wideband in the one or more TPMI.

In some embodiments, in response to N being equal to 8, the $\{1^{st},2^{nd},5^{th},6^{th}\}$ elements of each column of the precoding matrix are non-zero and the other elements are zero; or the $\{2^{nd},3^{rd},6^{th},7^{th}\}$ elements of each column of the precoding matrix are non-zero and the other elements are zero; or the $\{3^{rd},4^{th},7^{th},8^{th}\}$ elements of each column of the precoding matrix are non-zero and the other elements are zero; or the $\{1^{st},4^{th},5^{th},8^{th}\}$ elements of each column of the precoding matrix are non-zero and the other elements are zero.

In some embodiments, a part of information of the precoding matrix is indicated through a TPMI of a wideband in the one or more TPMI, and the other part of the information of the precoding matrix is indicated through a TPMI of a sub band in the One or more TPMI.

In some embodiments, in a case of the network device configuring the terminal device with a codebook subset constraint, the codebook subset only constrains antenna ports in one polarization antenna pair.

In some embodiments, the communication unit 420 is further configured to transmit an SRS configured for an uplink codebook transmission; wherein the SRS is configured for the network device to determine the one or more TPMI.

In some embodiments, the SRS is an SRS of N antenna ports.

In some embodiments, the communication unit described above may be a communication interface or a transceiver, or an input interface and an output interface of a communication chip or a system on a chip. The processing unit described above may be one or more processors.

It should be understood that the terminal device 400 according to the embodiments of the present disclosure may correspond to the terminal device in the method embodiments of the present disclosure. In addition, the above and other operations and/or functions of each unit in the terminal device 400 are respectively for achieving corresponding processes of the terminal device in the method 200 shown in FIG. 3.

FIG. 8 illustrates a schematic block view of a network device 500 according to some embodiments of the present disclosure. As shown in FIG. 8, the network device 500 includes a processing unit 510 and a communication unit 520.

The processing unit 510 is configured to determine a precoding matrix from a preconfigured codebook. The precoding matrix includes N rows, and N is a multiple of 2 and greater than 4. The precoding matrix satisfies a first condition or a second condition, the first condition is that each column of the precoding matrix includes two non-zero elements, and the second condition is that each column of the precoding matrix includes four non-zero elements.

The communication unit 520 is configured to transmit Transmit Precoding Matrix Indicators (one or more TPMI) corresponding to the precoding matrix to a terminal device; wherein the one or more TPMI are configured for the terminal device to determine the precoding matrix from the preconfigured codebook.

In some embodiments, non-zero elements in different columns of the precoding matrix have the same locations.

In some embodiments, the first condition is that each column of the precoding matrix includes the two non-zero elements and the two non-zero elements correspond to different antenna ports of a pair of polarization antennas.

In some embodiments, the second condition is that each column of the precoding matrix includes the four non-zero elements and the four non-zero elements correspond to different antenna ports of two adjacent pairs of polarization antennas.

In some embodiments, the two non-zero elements in the first condition are the $k^{th}$ element and the $[k+N/2]^{th}$ element, respectively, in one column, and k is a positive integer less than or equal to N/2.

In some embodiments, in response to N being equal to 8, the $\{1^{st},5^{th}\}$ elements of each column of the precoding matrix are non-zero and the other elements are zero; or the $\{2^{nd},6^{th}\}$ elements of each column of the precoding matrix are non-zero and the other elements are zero; or the $\{3^{rd},7^{th}\}$ elements of each column of the precoding matrix are non-zero and the other elements are zero; or the $\{4^{r},8^{th}\}$ elements of each column of the precoding matrix are non-zero and the other elements are zero.

In some embodiments, the four non-zero elements in the second condition are the $m^{th}$ element, the $[(m \bmod N/2)+1]^{th}$ element, the $[m+N/2]^{th}$ element, and the $[(m \bmod N/2)+N/2+1]^{th}$ element, respectively, in one column, m is a positive integer less than or equal to N/2, and mod indicates a modulus operation.

In some embodiments, the $m^{th}$ element is obtained by multiplying a first element in a first vector by a first weight value, and the $[m+N/2]^{th}$ element is obtained by multiplying a second element in the first vector by the first weight value; and/or the $[(m \bmod N/2)+1]^{th}$ element is obtained by multiplying a first element in a second vector by a second weight value, and the $[(m \bmod N/2)+N/2+1]^{th}$ element is obtained by multiplying a second element in the second vector by the second weight value. Both the first vector and the second vector are 2×1 vectors, the first weight value is a real or imaginary or complex number, and the second weight value is a real or imaginary or complex number.

In some embodiments, the first vector and the second vector are indicated through a TPMI of a wideband in the one or more TPMI, and the first weight value and the second weight value are indicated through a TPMI of a sub band in the one or more TPMI; or the first vector and the second vector are indicated through a TPMI of a sub band in the one or more TPMI, and the first weight value and the second weight value are indicated through a TPMI of a wideband in the one or more TPMI.

In some embodiments, in response to N being equal to 8, the $\{1^{st},2^{nd},5^{th},6^{th}\}$ elements of each column of the precoding matrix are non-zero and the other elements are zero; or the $\{2^{nd},3^{rd},6^{th},7^{th}\}$ elements of each column of the precoding matrix are non-zero and the other elements are zero; or the $\{3^{rd},4^{th},7^{th},8^{th}\}$ elements of each column of the precoding matrix are non-zero and the other elements are zero; or the $\{1^{st},4^{th},5^{th},8^{th}\}$ elements of each column of the precoding matrix are non-zero and the other elements are zero.

In some embodiments, a part of information of the precoding matrix is indicated through a TPMI of a wideband in the one or more TPMI, and the other part of the information of the precoding matrix is indicated through a TPMI of a sub band in the one or more TPMI.

In some embodiments, the communication unit 520 is further configured to receive an SRS transmitted by the terminal device and configured for an uplink codebook transmission.

The processing unit 510 is configured to determine the precoding matrix from the preconfigured codebook based on the SRS.

In some embodiments, the SRS is an SRS of N antenna ports.

In some embodiments, a case of the network device configuring the terminal device with a constraint for codebook subset constraint, the codebook subset only constrains antenna ports in one polarization antenna pair.

In some embodiments, the communication unit 520 is further configured to receive data precoded by the precoding matrix transmitted by the terminal device.

In some embodiments, the communication unit described above may be a communication interface or a transceiver, or an input interface and an output interface of a communication chip or a system on a chip. The processing unit described above may be one or more processors.

It should be understood that the network device 500 according to the embodiments of the present disclosure may correspond to the network device in the method embodiments of the present disclosure. In addition, the above and other operations and/or functions of each unit in the network device 500 are respectively for achieving corresponding processes of the network device in the method 300 shown in FIG. 6, which are not repeated herein for conciseness.

Figure 9:
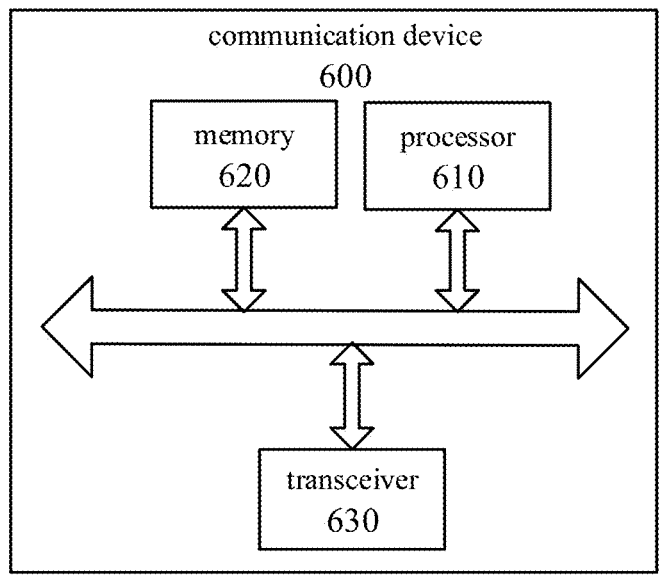
FIG. 9 is a schematic block view of a communication device according to some embodiments of the present disclosure.

FIG. 9 is a schematic block view of a communication device 600 according to some embodiments of the present disclosure. The communication device 600 shown in FIG. 9 includes a processor 610. The processor 610 is configured to call and run a computer program stored in a memory to implement the method in the embodiments of the present disclosure.

In some embodiments, as shown in FIG. 9, the communication device 600 may also include a memory 620. The processor 610 may call and run a computer program stored in the memory 620 to implement the method in the embodiments of the present disclosure.

The memory 620 may be a separate device independent of the processor 610, or may be integrated in the processor 610.

In some embodiments, as shown in FIG. 9, the communication device 600 may also include a transceiver 630. The processor 610 may control the transceiver 630 to communicate with other devices, e.g., control the transceiver 630 to transmit data or information to other devices or data, or control the transceiver 630 to receive information or data from other devices.

The transceiver 630 may include a transmitter and a receiver. The transceiver 630 may further include an antenna. The number of antennas may be one or more.

In some embodiments, the communication device 600 may be the network device in the embodiments of the present disclosure. The communication device 600 may implement a corresponding process performed by the network device in each method of the embodiments of the present disclosure, which is not repeated herein for the conciseness.

In some embodiments, the communication device 600 may be the terminal device in the embodiments of the present disclosure. The communication device 600 may implement a corresponding process performed by the terminal device in each method of the embodiments of the present disclosure, which is not repeated herein for the conciseness.

Figure 10:
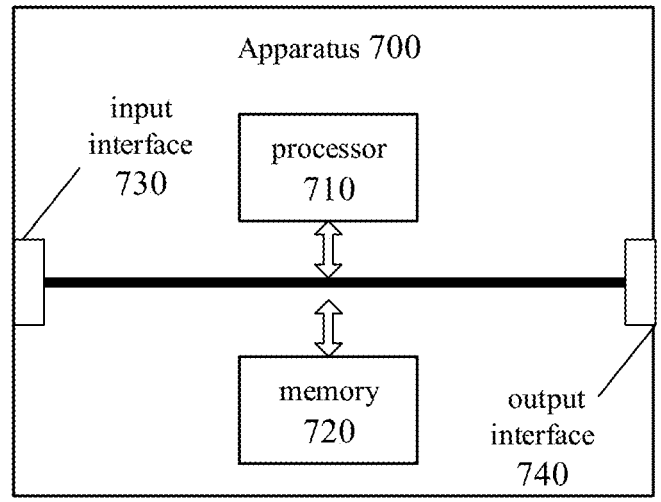
FIG. 10 is a schematic block view of an apparatus according to some embodiments of the present disclosure.

FIG. 10 is a schematic block view of an apparatus according to some embodiments of the present disclosure. The apparatus 700 shown in FIG. 10 includes a processor 710. The processor 710 is configured to call and run a computer program stored in a memory to implement the method in the embodiments of the present disclosure.

In some embodiments, as shown in FIG. 10, the apparatus 700 may also include a memory 720. The processor 710 may call and run a computer program stored in the memory 720 to implement the method in the embodiments of the present disclosure.

The memory 720 may be a separate device independent of the processor 710, or may be integrated in the processor 710.

In some embodiments, the apparatus 700 may also include an input interface 730. The processor 710 may control the input interface 730 to communicate with other devices or chips, e.g., control the input interface 730 to acquire information or data transmitted by the other devices or chips.

In some embodiments, the apparatus 700 may also include an output interface 740. The processor 710 may control the output interface 740 to communicate with other devices or chips, e.g., control the output interface 740 to output information or data to the other devices or chips.

In some embodiments, the apparatus 700 may be applied to the network device in the embodiments of the present disclosure. in addition, the apparatus 700 may implement a corresponding process performed by the network device in each method of the embodiments of the present disclosure, which is not repeated herein for the conciseness.

In some embodiments, the apparatus 700 may be applied to the terminal device in the embodiments of the present disclosure. in addition, the apparatus 700 may implement a corresponding process performed by the terminal device in each method of the embodiments of the present disclosure, which is not repeated herein for the conciseness.

In some embodiments, the apparatus mentioned in the embodiments of the present disclosure application may also be a chip. For example, the apparatus may be a system chip, a chip system, or a system-on-a-chip, etc.

Figure 11:
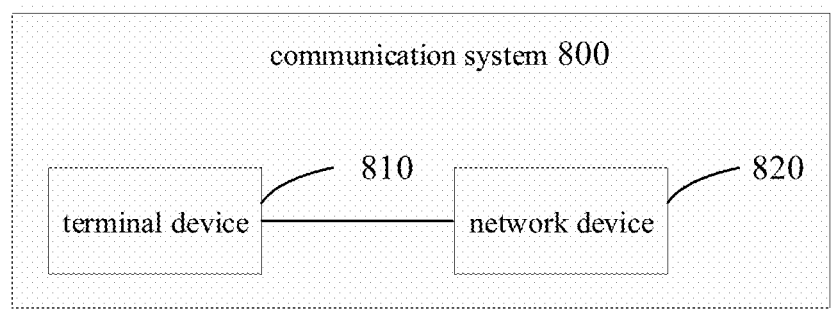
FIG. 11 is a schematic block view of a communication system according to some embodiments of the present disclosure.

FIG. 11 is a schematic block view of a communication system 800 according to some embodiments of the present disclosure. As shown in FIG. 11, the communication system 800 includes a terminal device 810 and a network device 820.

The terminal device 810 may be configured to implement corresponding functions achieved by the terminal device in the above method, and the network device 820 may be configured to implement corresponding functions achieved by the network device in the above method, which are not repeated herein for the conciseness.

It should be understood that the processor of the embodiments of the present disclosure may be an integrated circuit chip and has a signal processing capability. In the implementation process, each operation of the above method embodiments may be completed through an integrated logic circuit of a hardware in the processor or instructions in a form of a software. The processor described above may be a general-purpose processor, a Digital Signal Processor (DSP), an Application Specific Integrated Circuit (ASIC), a Field Programmable Gate Array (FPGA), or other programmable logic devices, transistor logic devices, hardware components, which may implement or perform each method, operation, and logic block disclosed in the embodiments of the present disclosure. The general-purpose processor may be a microprocessor or any conventional processor, etc. The operations of the method disclosed in conjunction with the embodiments of the present disclosure may be directly embodied to be implemented and completed by a hardware decoding processor, or by implemented and completed by a combination of hardware and software modules in a decoding processor. A software module may be located in a mature storage medium in the related art, such as a random memory, a flash memory, a read-only memory, a programmable read-only memory, or an electrically erasable programmable memory, a register, etc. The storage medium is located in the memory, and the processor reads information in the memory and completes the operations of the above method in combination with its hardware.

It can be understood that the memory in the embodiments of the present disclosure may be a volatile memory or a non-volatile memory, or may include both the volatile memory and the non-volatile memory. The non-volatile memory may be the Read-Only Memory (ROM), the Programmable ROM (PROM), an Erasable PROM (EPROM), the Electrically EPROM (EEPROM), or the flash memory. The volatile memory may be a Random Access Memory (RAM), which is used as an external cache. For example, not limitation illustration, may forms of RAMs may be available, such as a Static Random Access Memory (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory of systems and methods described herein are intended to include, but is not limited to, these memories and any of other suitable types of memories.

It should be understood that the memories described above are exemplary but not limiting illustrations. For example, the memory in the embodiments of the present disclosure may also be the SRAM, the DRAM, the SDRAM, the DDR SDRAM, the ESDRAM, the SLDRAM, and DR RAM, etc. That is, the memory in the embodiments of the present disclosure is intended to include but not limited to these memories and any of other suitable types of memories.

A computer-readable storage medium is provided in the embodiments of the present disclosure and configured to store a computer program.

In some embodiments, the computer-readable storage medium may be applied to the network device in the embodiments of the present disclosure. In addition, the computer program causes a computer to execute a corresponding process performed by the network device in each method of the embodiments of the present disclosure, which is not repeated herein for the conciseness.

In some embodiments, the computer-readable storage medium may be applied to the terminal device in the embodiments of the present disclosure. In addition, the computer program causes a computer to execute a corresponding process performed by the terminal device in each method of the embodiments of the present disclosure, which is not repeated herein for the conciseness.

A computer program product is provided in the embodiments of the present disclosure and includes computer program instructions.

In some embodiments, the computer program product may be applied to the network device in the embodiments of the present disclosure. In addition, the computer program instructions cause a computer to execute a corresponding process performed by the network device in each method of the embodiments of the present disclosure, which is not repeated herein for the conciseness.

In some embodiments, the computer program product may be applied to the terminal device in the embodiments of the present disclosure. In addition, the computer program instructions cause a computer to execute a corresponding process performed by the terminal device in each method of the embodiments of the present disclosure, which is not repeated herein for the conciseness.

A computer program is provided in the embodiments of the present disclosure.

In some embodiments, the computer program may be applied to the network device in the embodiments of the present disclosure. When the computer program is run on a computer, a computer is caused to perform a corresponding process performed by the network device in each method of the embodiments of the present disclosure, which is not repeated herein for the conciseness.

In some embodiments, the computer program may be applied to the terminal device in the embodiments of the present disclosure. When the computer program is run on a computer, a computer is caused to perform a corresponding process performed by the terminal device in each method of the embodiments of the present disclosure, which is not repeated herein for the conciseness.

One of ordinary skill in the art may appreciate that units and algorithm operations of each example described in conjunction with the disclosed embodiments herein may be implemented as an electronic hardware, or a combination of a computer software and the electronic hardware. Whether these functions are performed in a manner of the hardware or the software depends on particular applications and design constraints of the technical solutions. A skilled person may use a different method for each particular application to implement the described functions. However, such implementations should not be construed to be beyond the scope of the present disclosure.

Those skilled in the art may clearly understand that operating processes of the above-described system, apparatus, and units may refer to corresponding processes in the foregoing method embodiments, which are not repeated herein.

In some embodiments provided in the present disclosure, it should be understood that the disclosed system, apparatus, and methods may be implemented in other ways. For example, the apparatus embodiments described above are only illustrative. For example, the division of the units is only a logical function division, and other division manners may be allowed in actual implementations. For example, multiple units or components may be combined or integrated into another system, or some features may be ignored, or not implemented. On the other hand, the mutual coupling or direct coupling or communication connection shown or discussed may be an indirect coupling or communication connection through some interfaces, apparatus or units, which may be electrical, mechanical, or in other forms.

The units described above as separate components may be or may not be physically separated. The components illustrated as units may be or may not be physical units, i.e., they may be located in one place, or may be distributed to multiple network units. Some or all of the units may be selected according to actual needs to achieve the purpose of the solutions of the embodiments.

In addition, each function unit in each embodiment of the present disclosure may be integrated into one processing unit. Alternatively, each unit may exist physically alone. Alternatively, two or more units may be integrated into one unit.

When the functions are implemented in a form of a software functional module and are sold or used as an independent product, the functions may be stored in a computer-readable storage medium. Based on such understanding, the technical solution of the present disclosure in essence or portion of which contributing to the prior art, or a part of the technical solution may be embodied in a form of a software product. The software product is stored in a memory and includes a number of instructions which causes a computer device (may be a personal computer, a server or a network device, and the like) to perform all or parts of the operations of the method described in each embodiment of the present disclosure. The foregoing memory may include various media available to store program codes, such as a U disk, a removable hard disk, the ROM, the RAM, a magnetic disk, an optical disk, and the like.

The above description is simply some implementations of the present disclosure, the scope of the present disclosure is not limited thereto. Any modification or substitution easily considered by the skilled in the art within the technical scope disclosed by the present disclosure shall fall into the scope of the present disclosure. Therefore, the scope of present disclosure should be determined by the scope of the claims.

What is claimed is:

1. A wireless communication method, comprising:
   determining, by a terminal device, a precoding matrix from a preconfigured codebook based on one or more Transmit Precoding Matrix Indicator (TPMI) indicated by a network device; wherein the precoding matrix comprises N rows, N is a multiple of 2 and greater than 4, the precoding matrix satisfies a first condition, and the first condition is that each column of the precoding matrix comprises two non-zero elements;
   employing, by the terminal device, the precoding matrix to precode data; and
   transmitting, by the terminal device, precoded data;
   wherein the two non-zero elements in the first condition are a $k^{th}$ element and a $[k+N/2]^{th}$ element, respectively, in one column, and k is a positive integer less than or equal to N/2.

2. The method according to claim 1, wherein in response to N being equal to 8,
   $\{1^{st}, 5^{th}\}$ elements of each column of the precoding matrix are non-zero and the other elements are zero; or
   $\{2^{nd}, 6^{th}\}$ elements of each column of the precoding matrix are non-zero and the other elements are zero; or
   $\{3^{rd}, 7^{th}\}$ elements of each column of the precoding matrix are non-zero and the other elements are zero; or
   $\{4^{th}, 8^{th}\}$ elements of each column of the precoding matrix are non-zero and the other elements are zero.

3. The method according to claim 1, wherein the precoding matrix satisfies a second condition, the second condition is that each column of the precoding matrix comprises four non-zero elements, and the four non-zero elements in the second condition are an $m^{th}$ element, an $[(m \bmod N/2)+1]^{th}$ element, an $[m+N/2]^{th}$ element, and an $[(m \bmod N/2)+N/2+1]^{th}$ element, respectively, in one column, m is a positive integer less than or equal to N/2, and mod indicates a modulus operation.

4. The method according to claim 3, wherein the $m^{th}$ element is obtained by multiplying a first element in a first vector by a first weight value, and the $[m+N/2]^{th}$ element is obtained by multiplying a second element in the first vector by the first weight value; and/or
   the $[(m \bmod N/2)+1]^{th}$ element is obtained by multiplying a first element in a second vector by a second weight value, and the $[(m \bmod N/2)+N/2+1]^{th}$ element is obtained by multiplying a second element in the second vector by the second weight value;
   wherein both the first vector and the second vector are 2×1 vectors, the first weight value is a real or imaginary or complex number, and the second weight value is a real or imaginary or complex number.

5. The method according to claim 4, wherein the first vector and the second vector are indicated through a TPMI of a wideband in the one or more TPMI, and the first weight value and the second weight value are indicated through a TPMI of a sub band in the one or more TPMI; or
   the first vector and the second vector are indicated through a TPMI of a sub band in the one or more TPMI, and the first weight value and the second weight value are indicated through a TPMI of a wideband in the one or more TPMI.

6. The method according to claim 1, wherein in response to N being equal to 8,
   $\{1^{st}, 2^{nd}, 5^{th}, 6^{th}\}$ elements of each column of the precoding matrix are non-zero and the other elements are zero; or
   $\{2^{nd}, 3^{rd}, 6^{th}, 7^{th}\}$ elements of each column of the precoding matrix are non-zero and the other elements are zero; or
   $\{3^{rd}, 4^{th}, 7^{th}, 8^{th}\}$ elements of each column of the precoding matrix are non-zero and the other elements are zero; or
   $\{1^{st}, 4^{th}, 5^{th}, 8^{th}\}$ elements of each column of the precoding matrix are non-zero and the other elements are zero.

7. A terminal device, comprising:
   a processor; and a memory; wherein the memory has a computer program stored thereon, and the processor is configured to call and run the computer program stored in the memory, to cause the terminal device to perform steps of:

determining a precoding matrix from a preconfigured codebook based on one or more Transmit Precoding Matrix Indicator (TPMI) indicated by a network device; wherein the precoding matrix comprises N rows, N is a multiple of 2 and greater than 4, the precoding matrix satisfies a first condition, and the first condition is that each column of the precoding matrix comprises two non-zero elements;

employing the precoding matrix to precode data; and transmitting precoded data;

wherein the two non-zero elements in the first condition are a $k^{th}$ element and a $[k+N/2]^{th}$ element, respectively, in one column, and k is a positive integer less than or equal to N/2.

8. The terminal device according to claim 7, wherein in response to N being equal to 8, $\{1^{st}, 5^{th}\}$ elements of each column of the precoding matrix are non-zero and the other elements are zero; or $\{2^{nd}, 6^{th}\}$ elements of each column of the precoding matrix are non-zero and the other elements are zero; or $\{3^{rd}, 7^{th}\}$ elements of each column of the precoding matrix are non-zero and the other elements are zero; or $\{4^{th}, 8^{th}\}$ elements of each column of the precoding matrix are non-zero and the other elements are zero.

9. The terminal device according to claim 7, wherein the precoding matrix satisfies a second condition, the second condition is that each column of the precoding matrix comprises four non-zero elements, and the four non-zero elements in the second condition are an $m^{th}$ element, an $[(m \mod N/2)+1]^{th}$ element, an $[m+N/2]^{th}$ element, and an $[(m \mod N/2)+N/2+1]^{th}$ element, respectively, in one column, m is a positive integer less than or equal to N/2, and mod indicates a modulus operation.

10. The terminal device according to claim 9, wherein the $m^{th}$ element is obtained by multiplying a first element in a first vector by a first weight value, and the $[m+N/2]^{th}$ element is obtained by multiplying a second element in the first vector by the first weight value; and/or the $[(m \mod N/2)+1]^{th}$ element is obtained by multiplying a first element in a second vector by a second weight value, and the $[(m \mod N/2)+N/2+1]^{th}$ element is obtained by multiplying a second element in the second vector by the second weight value;

wherein both the first vector and the second vector are 2×1 vectors, the first weight value is a real or imaginary or complex number, and the second weight value is a real or imaginary or complex number.

11. The terminal device according to claim 10, wherein the first vector and the second vector are indicated through a TPMI of a wideband in the one or more TPMI, and the first weight value and the second weight value are indicated through a TPMI of a sub band in the one or more TPMI; or the first vector and the second vector are indicated through a TPMI of a sub band in the one or more TPMI, and the first weight value and the second weight value are indicated through a TPMI of a wideband in the one or more TPMI.

12. The terminal device according to claim 7, wherein in response to N being equal to 8, $\{1^{st}, 2^{nd}, 5^{th}, 6^{th}\}$ elements of each column of the precoding matrix are non-zero and the other elements are zero; or $\{2^{nd}, 3^{rd}, 6^{th}, 7^{th}\}$ elements of each column of the precoding matrix are non-zero and the other elements are zero; or $\{3^{rd}, 4^{th}, 7^{th}, 8^{th}\}$ elements of each column of the precoding matrix are non-zero and the other elements are zero; or $\{1^{st}, 4^{th}, 5^{th}, 8^{th}\}$ elements of each column of the precoding matrix are non-zero and the other elements are zero.

13. A network device, comprising:

a processor; and a memory; wherein the memory has a computer program stored thereon, and the processor is configured to call and run the computer program stored in the memory, to cause the network device to perform steps of:

determining a precoding matrix from a preconfigured codebook; wherein the precoding matrix comprises N rows, N is a multiple of 2 and greater than 4, the precoding matrix satisfies a first condition, and the first condition is that each column of the precoding matrix comprises two non-zero elements; and transmitting one or more Transmit Precoding Matrix Indicator (TPMI) corresponding to the precoding matrix to a terminal device; wherein the one or more TPMI are configured for the terminal device to determine the precoding matrix from the preconfigured codebook;

wherein the two non-zero elements in the first condition are a $k^{th}$ element and a $[k+N/2]^{th}$ element, respectively, in one column, and k is a positive integer less than or equal to N/2.

14. The network device according to claim 13, wherein in response to N being equal to 8, $\{1^{st}, 5^{th}\}$ elements of each column of the precoding matrix are non-zero and the other elements are zero; or $\{2^{nd}, 6^{th}\}$ elements of each column of the precoding matrix are non-zero and the other elements are zero; or $\{3^{rd}, 7^{th}\}$ elements of each column of the precoding matrix are non-zero and the other elements are zero; or $\{4^{th}, 8^{th}\}$ elements of each column of the precoding matrix are non-zero and the other elements are zero.

15. The network device according to claim 13, wherein the precoding matrix satisfies a second condition, the second condition is that each column of the precoding matrix comprises four non-zero elements, and the four non-zero elements in the second condition are an $m^{th}$ element, an $[(m \mod N/2)+1]^{th}$ element, an $[m+N/2]^{th}$ element, and an $[(m \mod N/2)+N/2+1]^{th}$ element, respectively, in one column, m is a positive integer less than or equal to N/2, and mod indicates a modulus operation.

16. The network device according to claim 15, wherein the $m^{th}$ element is obtained by multiplying a first element in a first vector by a first weight value, and the $[m+N/2]^{th}$ element is obtained by multiplying a second element in the first vector by the first weight value; and/or the $[(m \mod N/2)+1]^{th}$ element is obtained by multiplying a first element in a second vector by a second weight value, and the $[(m \mod N/2)+N/2+1]^{th}$ element is obtained by multiplying a second element in the second vector by the second weight value;

wherein both the first vector and the second vector are 2×1 vectors, the first weight value is a real or imaginary or complex number, and the second weight value is a real or imaginary or complex number.

17. The network device according to claim 13, wherein in response to N being equal to 8, $\{1^{st}, 2^{nd}, 5^{th}, 6^{th}\}$ elements of each column of the precoding matrix are non-zero and the other elements are zero; or $\{2^{nd}, 3^{rd}, 6^{th}, 7^{th}\}$ elements of each column of the precoding matrix are non-zero and the other elements are zero; or $\{3^{rd}, 4^{th}, 7^{th}, 8^{th}\}$ elements of each column of the precoding matrix are non-zero and the other elements are zero; or $\{1^{st}, 4^{th}, 5^{th}, 8^{th}\}$ elements of each column of the precoding matrix are non-zero and the other elements are zero.

18. The network device according to claim 16, wherein the first vector and the second vector are indicated through a TPMI of a wideband in the one or more TPMI, and the first weight value and the second weight value are indicated through a TPMI of a sub band in the one or more TPMI; or the first vector and the second vector are indicated through a TPMI of a sub band in the one or more TPMI, and the first weight value and the second weight value are indicated through a TPMI of a wideband in the one or more TPMI.

* * * * *